United States Patent [19]
Holt et al.

[11] Patent Number: 5,528,261
[45] Date of Patent: Jun. 18, 1996

[54] OPERATING SYSTEM SOFTWARE ARCHITECTURE AND METHODS FOR SUPPORTING COLOR PROCESSING

[75] Inventors: Lindsay B. Holt, San Jose; James A. Quarato; Jerry G. Harris, both of Sunnyvale; Ryoji Watanabe, Cupertino; Keith McGreggor, San Jose, all of Calif.

[73] Assignee: Apple Computer, Inc., Cupertino, Calif.

[21] Appl. No.: 896,112

[22] Filed: Jun. 9, 1992

[51] Int. Cl.$^6$ .................................................. G09G 5/02
[52] U.S. Cl. .......................... 345/150; 345/133; 345/153
[58] Field of Search .................................. 395/131, 133; 345/132, 133, 150, 153

[56] References Cited

U.S. PATENT DOCUMENTS

| | | | |
|---|---|---|---|
| 4,500,919 | 2/1985 | Schreiber | 358/78 |
| 4,821,220 | 4/1989 | Duisberg | 364/578 |
| 5,029,107 | 7/1991 | Lee | 345/132 X |

FOREIGN PATENT DOCUMENTS

| | | |
|---|---|---|
| 0425420 | 2/1991 | European Pat. Off. . |

OTHER PUBLICATIONS

Setrag Khoshafian et al, Intelligent Offices, John Wiley & Sons, Inc., NY, 1985–1992, pp. 236–241, 307–312.

Setrag Khoshafian et al, Object Orientation, John Wiley & Sons, Inc., NY, 1990, pp. 43–45, 150–152, 376–383.

Word Perfect, Word Perfect Corporation, 1989, pp. 64–69, 486–487.

Tektronix HVC: A Uniform Perceptual Color System for Display Users, Joann M. Taylor, Gerald M. Murch and Paul A. McManus, Tektronix Laboratories, Beaverton, OR.

A Planning Guide for Developers, Kodak Photo CD System, May 1991.

Using Photographic-Quality Images in Desktop Applications, Alain Rossman, C. Cube MicroSystems Panel Proceedings, ACM Siggraph '90 Dallas, TX Aug. 1990.

Algorithms for Fast Color Correction, SID, vol. 30/3, 1989 Alan W. Paeth, University of Waterloo, Waterloo, Ontario, Canada.

Color Descriptors in Page Description Languages, SID, vol. 30/3, 1989 M. A. Dvonch, P. Roetling and R. Buckley, Xerox Corporation, Webster, NY.

Video to Print,—An Empirical Approach, SID, vol. 30/3, 1989 M. G. Lamming, Xerox Palo Alto Res. Ctr, Palo Alto, CA. and W. Rhodes, Chromatech, Inc., Altadena, CA.

Optimization of Digital Color Reproduction on the Basis of Visual Assessment of Reproduced Images, P. Laihanen, SID, vol. 30/3 1989 Helsinki Univ. of Technology, Espoo, Finland.

(List continued on next page.)

Primary Examiner—Ulysses Weldon
Attorney, Agent, or Firm—Burns, Doane, Swecker & Mathis

[57] ABSTRACT

An operating system software architecture, implemented in an object-oriented design, supports and processes color. The object-oriented design has two levels, one being a class (TColor) defining a virtual abstract base class and being a container class containing calibrated colors, the other being a class (TDeviceColor) defining a virtual abstract base class and a container class containing uncalibrated colors. Several calibrated color classes including a class (TXYZColor) defining XYZ color space descend directly from class (TColor), several uncalibrated color classes including a class (TRGBColor) descending directly from class (TDeviceColor), a class (TColorGamut) storing color gamut information of peripheral devices that may interface with the architecture, and a class (TColorProfile) storing tonal reproduction curves of the peripheral devices provide data structures, together with method functions for various color processing. The architecture is extensible to add new color classes as new color models and devices are developed, to add new color matching algorithms as desired, allows users to work in color space of their choice, and provides for color matching amongst any peripheral devices interfacing with the architecture.

61 Claims, 5 Drawing Sheets

OTHER PUBLICATIONS

CRT to Print—A Subjective Matter, M. G. Lamming, Xerox Palo Alto Res. Ctr., Palo Alto, CA. and W. Rhodes, Chromatech Inc, Anadena, CA.

Towards "Wyswyg" Color A Simplified Method for Improving the Printed Appearance of Computer Generated Images; M. Lamming & W. Rhodes, Xerox, Palo Alto CA Jun. 1987.
Color Science for Imaging Systems, L. E. Demarsh and E. J. Giorgianni Physics Today Sep./89.

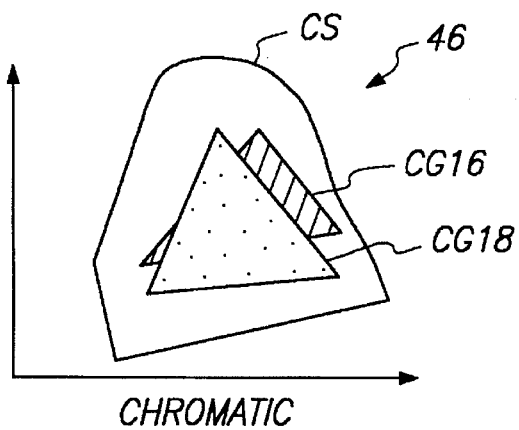
FIG. 2
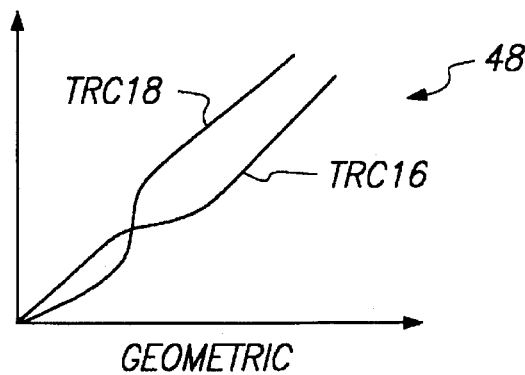
FIG. 3
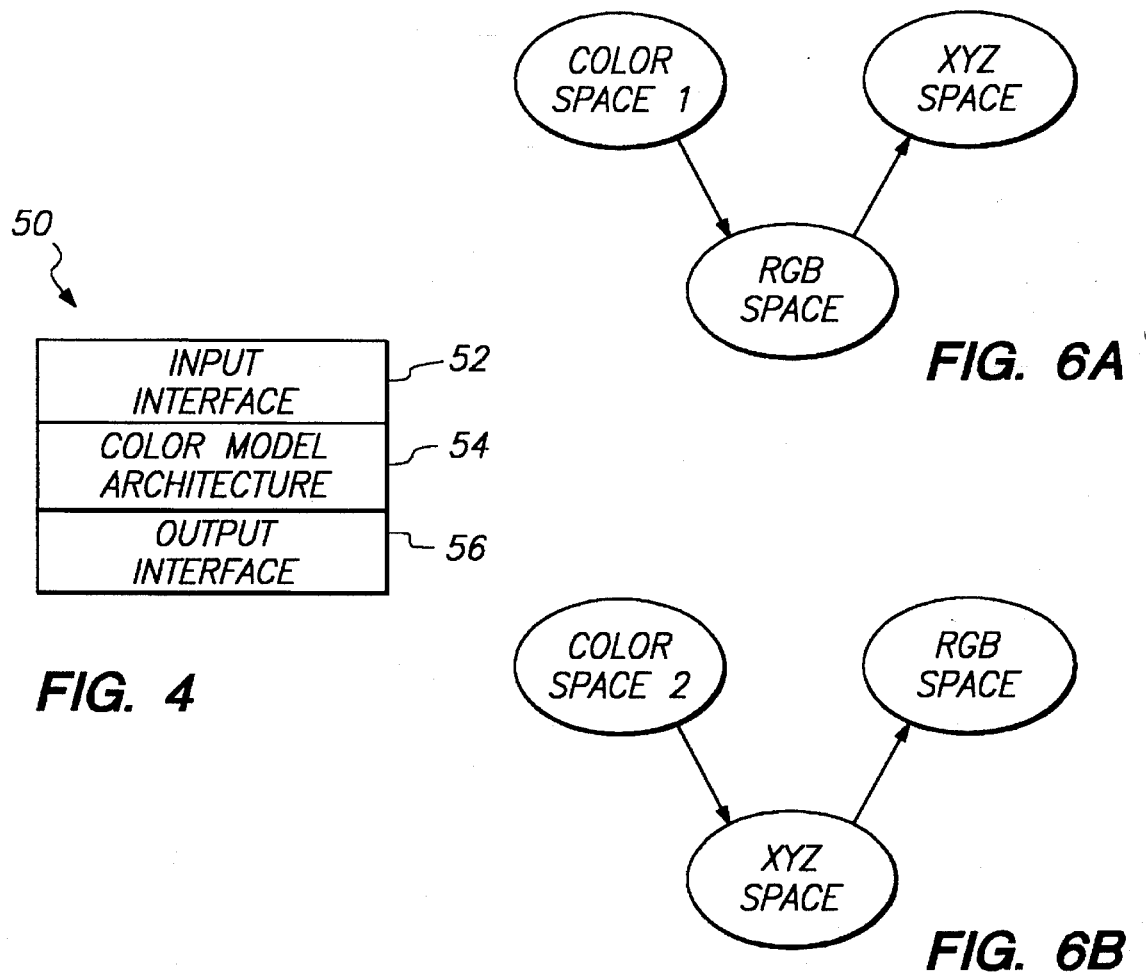
FIG. 4
FIG. 6A
FIG. 6B

OPERATING SYSTEM SOFTWARE ARCHITECTURE AND METHODS FOR SUPPORTING COLOR PROCESSING

BACKGROUND OF THE INVENTION

1. Field of the Invention

The present invention relates generally to operating system software architectures and, more particularly, to an operating system software architecture and methods for supporting color processing.

2. Description of Related Art

Computer systems are information-handling systems that are designed to process a wide variety of information including text and graphics. These computer systems, including their hardware and software, are becoming increasingly sophisticated so as to be able to process this information in color, but are still limited in their ability to support and process such color information. For example, one area of such limited capability of computer systems relates to interfacing with and supporting a wide variety of peripheral devices that display, print, plot or otherwise present color to a viewer under computer control. Another area is the limited ability of a computer programmer or computer user to program or process color in a "color space" of his or her choice on the computer system.

More specifically, and with respect to the one area mentioned above, several of the more prevalent color peripheral devices include displays such as computer monitors and TV screens, printers such as ink-jet, laser and photolithography printers, and plotters such as electrostatic and drum/flatbed plotters. Each of these devices may be coupled to or interface with the computer system, in which the color information that is displayed, printed or plotted is processed by the computer system's hardware, operating systems software and applications software.

At least two aspects of these color peripheral devices relate to (1) the color space in which they operate and (2) their color device-dependency. Color space is three-dimensional space in which each point in the space corresponds to a color. For example, RGB color space is a device color space in which each point is a color formed of the additive amounts of red (R), green (G) and blue (B) colorants. A color monitor or a TV screen typically operates in RGB color space in which red, green and blue colorant phosphors on the monitor or screen are combined to display a particular color. Another example is CYMK color space in which each point is a color formed of the subtractive amounts of cyan (C), magenta (M), yellow (Y) and black (K). Printers using ink normally operate in CYMK color space in which the ink colorants are combined to form a color on a hard copy medium. Other color spaces related to various color devices are well-known in the art.

Color device-dependency is associated with the fact that each device has its own "color gamut". A color gamut is the range of colors producible within the color space with a set of colorant phosphors, inks or other colorants of the given device. In other words, the color gamut of a given device constitutes a particular region of the visible colors that can be produced by the device. For example, an RGB color monitor manufactured by one manufacturer may have a different color gamut than an RGB color monitor manufactured by another manufacturer, or different models of color monitors manufactured by the same manufacturer may have different color gamuts, thereby making their producible colors "device-dependent". In addition, each device may have its own color "profile", which is a measure of how non-ideal the particular device is in actually producing a color called for within its gamut. Thus, for example, the same red tie displayed on two different color monitors may have a different color red appearance, thereby resulting in device dependency and color inaccuracies. For a more detailed explanation of color, color space, color gamuts and other color related principles described and illustrated in this specification, reference may be made, for example, to *Principles of Color Technology*, 2nd Edition, by Fred W. Billmeyer, Jr. and Max Saltzman, John Wiley & Sons, 1981; *Color and the Computer*, by H. John Durett, Academic Press, Inc., 1987; and *Computer Graphics: Principles and Practice*, by Foley et al., Addison-Wesley Publishing Co., Inc., 1990.

One feature of color processing in such prior computer systems relates to "color matching". A user of the computer system may want to use the printer to make a hard copy of a color image that appears on the color monitor, or may want to present a color image on the monitor of a hard copy image appearing on the printer. Since these peripheral devices operate in different color space and have different gamuts and profiles, the color of an image appearing on one device will not match the color appearing on the other device. However, the computer system will have a software operating systems architecture that will implement a color matching scheme whereby the color appearing on one of the devices will closely, if not substantially identically, be caused to match the color transferred to the other device.

Prior software operating systems architectures are limited in their color processing capability. One limitation is that the operating systems architecture may not be able to support a given peripheral device functioning in a color space for which the architecture was not designed or could not be modified to support. Also, a prior architecture may be capable of supporting and matching color of a particular peripheral device, such as a color monitor, having its own color space, gamut and profile characteristics to another peripheral device, such as a particular color printer having its own such color characteristics. Nevertheless, another limitation is that if one or more different types of color monitors and printers having color characteristics different from the above-mentioned particular color monitor and printer are coupled to the computer, and/or other types of color peripheral devices are coupled to the computer, such as a plotter or a color TV camera, the prior computer system, and specifically its operating systems architecture, will not be able to support color matching for any of these other different peripheral devices.

Furthermore, as to the other area mentioned above, computer users of the computer system may want to work in any number of color spaces of their choice different than the color spaces of the peripheral devices supported by the prior limited operating systems architecture. For example, two color spaces in addition to RGB and CYMK color spaces are known as Luv and HSL color spaces. However, the computer user working on the above-described computer systems having the limited operating systems architecture may be able to work only in the RGB color space of the monitor or the CYMK color space of the printer, and not the other color spaces.

SUMMARY OF THE INVENTION

The present invention provides a unique operating systems architecture and methods that support color processing on a global scale. The operating systems color architecture and methods support any number of different peripheral color devices, as well as any different number of color matching schemes. In other words, the color architecture of the present invention is not tied or constrained to any one peripheral device manufacturer's approach to color usage for its devices, nor is the architecture itself a color matching scheme. Moreover, as new color peripheral devices are interfaced with a given computer system having the architecture of the present invention, the manufacturer of such new devices will be assured that they will properly communicate with all existing color peripheral devices interfaced to the system.

Furthermore, the operating systems color architecture and methods free color users of the architecture to work in any color space that they prefer, and is fully extensible so that as new color models or spaces may be created or required by applications software programmers, they can be added to and thereby be supported by the architecture. Concomitantly, the architecture of the present invention ensures that as color models are added, they are fully integrated into and can use any other color models that had already been added to the system.

Also, two overall types of color spaces exist, one being uncalibrated color or device dependent and the other being calibrated color or device independent. In accordance with another feature of the present invention, the architecture supports calibrated colors, together with uncalibrated colors which have their own gamuts so that each uncalibrated color knows how to make itself calibrated, i.e., how to specify their relationship to calibrated color space.

The operating systems color architecture of the present invention is implemented as an object-oriented design to carry out the above-mentioned features. The general theory and techniques of object-oriented design are well-known in the art, as described, for example, in *Object Oriented Design with Applications*, by Grady Booch, The Benjamin/Cummings Publishing Company, 1991.

According to one aspect, the object-oriented operating systems color architecture of the present invention includes an integrated color module having one interface level being a class (TColor) defining a virtual abstract base class and a container class containing calibrated colors, another interface level being a class (TDeviceColor) defining a virtual abstract base class and a container class containing uncalibrated colors, a class (TColorGamut) containing data defining the color gamut of each peripheral device interfacing with the architecture, and a class (TColorProfile) containing data defining a tonal reproduction curve for each such peripheral device; an input interface software module for inputting color data from peripheral devices to the integrated color module; and an output software interface module for outputting color data processed by the integrated color module to peripheral devices.

According to another aspect, the object-oriented software systems architecutre of the present invention has a class (TColor), from which all color classes descend, which is a base class and a container class for calibrated colors; a class (TDeviceColor), descending directly from the class (TColor), which is a base class and a container class for uncalibrated colors; at least one calibrated color class (TXYZColor) descending directly from class (TColor); at least one uncalibrated color class (TRGBColor) descending directly from class (TDeviceColor); a class (TColorGamut) containing a template for storing color gamut information of one or more peripheral devices; and a class (TColorProfile) containing a template for storing color profile information of the one or more peripheral devices.

According to yet another aspect, the present invention constitutes a color processing system having a data processor capable of interfacing with a plurality of peripheral devices; and an object-oriented software operating systems architecture which has one or more of the properties of i) processing calibrated and uncalibrated colors in relation to calibrated and uncalibrated color space, respectively; ii) transforming uncalibrated colors into calibrated colors; iii) every color getting an RGB color and an XYZ color from itself; iv) every color setting itself with an RGB color and an XYZ color; v) every color constructing itself from a TColor; vi) every color setting itself from a TColor; vii) interfacing with any peripheral device which knows what colors it can produce/record by having a measureable color gamut; and viii) interfacing with any peripheral device which knows how to characterize itself with respect to an ideal device by having measureable tonal reproduction curves.

Yet in another aspect, the method of the present invention constitutes the architecture receiving source color data from a source color device; calling a class (TColorGamut) storing data identifying the color gamuts of the source color device and a destination color device, respectively; calling a class (TColorProfile) storing data identifying the color profiles of the source color device and the destination color device, respectively; calling a class (TColorMatcher) storing a method function for matching the color of the source color device to the color of the destination color device; using the method function, the color gamut data and the color profile data of the source color device and the destination color device to provide destination color data matching the source color data; and sending the destination color data to the destination color device.

Other aspects and advantages of the present invention can be seen upon review of the figures, the detailed description and the claims which follow.

BRIEF DESCRIPTION OF THE DRAWINGS

FIG. 2 is a chromatic graph illustrating color space and color gamuts.

FIG. 3 is a geometric graph illustrating a tonal reproduction curve or profile for one colorant of a peripheral device.

FIG. 4 illustrates in block diagram the basic software components of the present invention.

FIG. 6A and FIG. 6B illustrate pictorially the transformations of color from one color space to one or more other color spaces.

DETAILED DESCRIPTION OF THE INVENTION

Figure 1:
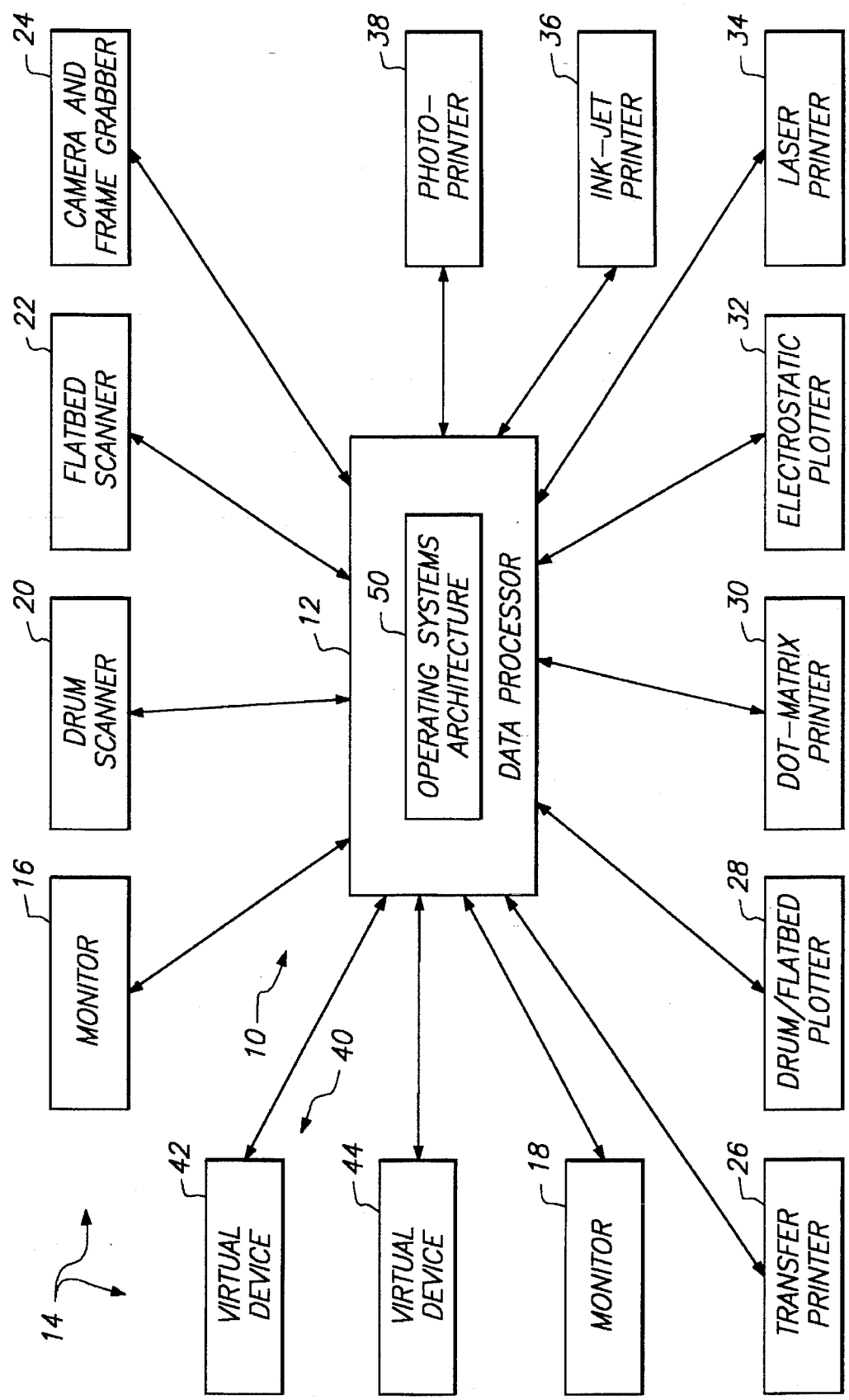
FIG. 1 is a block diagram of a computer system having the operating systems color architecture of the present invention which supports color processing.

FIG. 1 illustrates a computer system 10 that includes a computer or data processor 12 which may interface with one or more of a plurality of peripheral devices 14. Each of these peripheral devices 14 is a color device that can be added to or removed from interfacing with the processor 12. The peripheral devices 14 are examples of color devices that can provide color information to or receive color information from the data processor 12. Thus, for example, the color devices 14 may include a monitor 16, a monitor 18, a drum scanner 20, a flatbed scanner 22, a camera and frame grabber 24, a transfer printer 26, a drum/flatbed plotter 28, a dot matrix printer 30, an electrostatic plotter 32, a laser printer 34, an ink-jet printer 36 and a photolithography printer 38. While only a single data processor 12 is shown, the operating systems software architecture of the present invention also will support multiple processors 12 which may be coupled in a parallel hardware architectural system.

The peripheral devices 14 which interface with data processor 12 are real devices which operate under various color spaces, such as RGB color space for monitor 16 or monitor 18, and CYMK color space for printer 36. In addition, FIG. 1 illustrates virtual devices 40 which may interface with processor 12 and which manipulate color in selected color spaces. For example, a virtual device 42 may manipulate color in a known color space HLS, whereas another virtual device 44 may manipulate color in another known color space xyY.

Each peripheral device 14, operating in a given color space, may have its own individual color gamut and color profile. FIGS. 2–3, respectively, illustrate by way of example for each of the devices 14 a chromatic graph 46 and a geometric graph 48. The two-dimensional graph 46 of FIG. 2 shows a color space CS, such as RGB color space, under which, for example, monitor 16 and monitor 18 both operate. Nevertheless, the monitor 16 and monitor 18 have different color gamuts CG illustrated in FIG. 2 as gamuts CG16 and CG18, respectively. The information in FIG. 2 is plotted in CIE ("Commission International de l'Eclairage") chromaticity space xyY. The third dimension Y is not shown, though color gamuts are three-dimensional objects. The graph 48 shows different color profiles or tonal reproduction curves TRC16 and TRC18 for one color, e.g., red, for the respective monitor 16 and monitor 18. These curves TRC16 and TRC18 represent a measure of how non-ideal each monitor 16 and 18, respectively, is in reproducing the color red within the respective color gamuts CG16 and CG18.

Each graph 46 and graph 48 represents color data that is stored in the data processor 12 for each of the devices 14 for use by the operating systems color architecture of the present invention to carry out color processing as will be described more fully below. Thus, for example, monitor 16 may be manufactured by one company and monitor 18 may be manufactured by another company, or monitors 16 and 18 may be different models manufactured by the same company, and both may operate under RGB color space. Nevertheless, each may have a different color gamut CG and tonal reproduction curve TRC. The same would be true for all of the other peripheral devices 14 shown on FIG. 1, and, yet, the color operating systems architecture of the present invention is extensible to support color processing with respect to all these different types of real and virtual devices.

FIG. 4 illustrates operating systems software 50 (also shown in FIG. 1) that includes an input interface module 52, a color model architecture 54 and an output interface module 56. Input interface module 52 interfaces indirectly with the peripheral devices 14 to supply color information for processing by the color model architecture 54. The output interface module 56 interfaces with the peripheral devices 14 to output color information processed by the color model architecture 54 to the peripheral devices 14.

Figure 5:
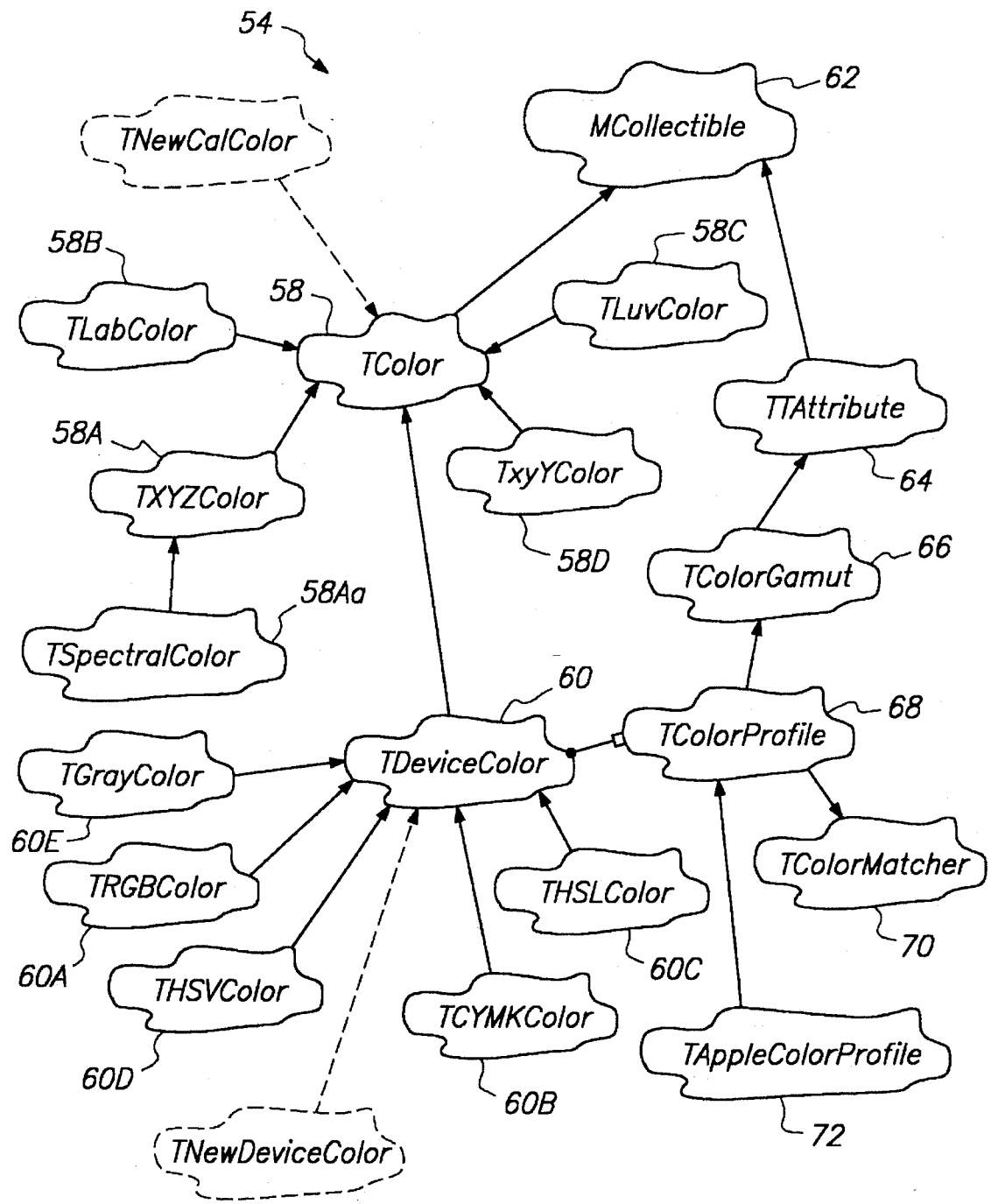
FIG. 5 is a class diagram of the color architecture of the present invention as implemented in an object-oriented programming design.

FIG. 5 illustrates a class diagram of the color architecture 54 implemented in an object-oriented programming design.

This class diagram shows the existence of classes and their relationships in the logical design of the architecture 54. In conventional class diagram nomenclature, an icon or "amorphous blob", such as the one identified TColor (Block 58), represents a class being an abstraction with crisply defined boundaries. Also, other icons shown as arrows indicate inheritance relationships between the classes, so that, for example, the class identified as TXYZColor (Block 58A) inherits from the class TColor (Block 58) and the class identified as TSpectralColor (Block 58Aa) inherits from the class TXYZColor (Block 58A). Generally, a class or object in object-oriented design encapsulates structure (i.e., data) and behavior (i.e., method functions) which operate on the structure.

The color architecture may be written in any one of a number of different object-oriented programming languages, such as the well-known languages identified as Smalltalk, Ada, CLOS, C and C++. The present specification describes the architecture 54 as if it were written in the language C++.

The architecture 54, based on object-oriented principles, will have a number of general properties as will now be described. Data are abstracted and encapsulated, that is, objects that represent color, or objects that contain color, can be represented in many different forms with varying types of data format without changing the overall architecture 54. The interfaces to the objects will remain constant while the objects themselves are abstract and independent. In object-oriented design, an interface is an outside view of a class or object, which emphasizes the abstraction of the class or object while hiding the structure and behavior of the class or object.

Furthermore, all objects that descend from a color base class such as base class TColor (Block 58) described more fully below will have the same properties as the base class and are polymorphic with respect to base class operations. This is called inheritance, which means that any color object that descends from the base class inherits the properties of the base class and can be used to represent an instance of the base class or be substituted wherever a base class is called for. This allows virtually unlimited color spaces to be represented and used by the systems architecture 54 without a programmer or user knowing just exactly how its data content is represented. Color spaces and color matching therefore can be extended as new color models and matching schemes are developed, which is the extensibility feature of the architecture 54.

In addition, the above properties are further amplified if a base class is represented by a template class. In the programming language C++, a template class refers to a set of classes that share the same properties, or in other words a class of classes. Several template classes are described below.

As an example, consider an object represented by the general abstract class TColor (Block 58). Suppose the content of the object is represented as four component pieces of cyan (C), magenta (M), yellow (Y) and black (K). The size and definition of these component pieces is retained by the object and is hidden from its client user. Take another TColor class object whose components are made up of NTSC YIQ values, again defined by the object itself. One color can be added to the other (for some definition of add), or matched to the other or copied simply by accessing the method functions of the interface. In pseudo-code, these three alternatives of adding, matching or copying may be written, as follows:

```
/* These are the definitions of two different
types of color classes */
class TCMYKColor : public TColor {
...    //Definition for CYMK color };
Class TYIQColor : public TColor {
...    //Definition for YIQ color };
/* Now instantiate one of each */
TYIQColor colorYIQ(i,y,q);// set with some predefined
i,y,q values
TCMYKColor colorCMYK(c,m,y,k); // set also with some
predefined values
TXYZColor colorXYZ; // some other color object
/* Add the two colors together to make a third */
colorXYZ = colorYIQ + colorCMYK;
/* convert colorCMYK to match colorYIQ */
colorCMYK = colorYIQcolorYIQ; // the original colorCMYK
is gone at this point
```

Operations of the above type are complete and well defined because the addition operation, i.e., a method function stored in class TColor (Block 58) is well defined by the base class TColor (Block 58). The way this add operation may be performed by the base class is first both colors CMYK and YIQ are converted or transformed to a common and well-known calibrated color (XYZ in this case). That is, colorYIQ and colorCMYK both get transformed to colorXYZ, respectively, using a given transformation process or algorithm (which also may be stored as a method function in class TColor (Block 58). These two XYZ components are then added in XYZ color space to obtain the resultant color in XYZ space. If the final color is to be XYZ color, then no further transformation need occur and the resultant color may be stored in class TXYZ (Block 58A). If the final color is to be other than XYZ color, then another transformation will occur using a given transformation algorithm (also stored as a method function in, for example, class TColor), from resultant color XYZ into the final color and stored in the corresponding class.

Furthermore, the architecture 54 also supports equally well operations within a single color space, e.g., TXXXColor=TXXXColor1 TXXXColor2, or operations between color spaces, e.g., TXXXColor=TFOOColor+TBARColor. Operations within a single color space are defined by the color space. Operations between color spaces are defined by the transformation to a calibrated color space, e.g. XYZ, operate in the calibrated color space, and then get untransformed.

Another general feature of the architecture 54 is that all of the color classes (calibrated and uncalibrated) descend from the base class TColor (Block 58). This, as will be described more fully below, enables the architecture 54 to use the object-oriented principle of polymorphism on colors. Polymorphism is a concept according to which a name (such as a variable declaration) may denote objects of many different classes that are related by a common superclass, i.e., class TColor (Block 58); thus, any object denoted by this name is able to respond to some comparison set of operations in different ways.

Also, the color architecture 54 represented by the class diagram of FIG. 5 essentially has two levels. The first level is indicated by the class TColor (Block 58 and its subclasses). As already indicated, the class TColor (Block 58) is both an interface defining a virtual abstract base class and a container class which contains device independent or calibrated colors used for color transformation into other color spaces and for color matching, as will be described more fully below. The second or other level of the architecture 54 is illustrated by the class identified as TDeviceColor (Block 60 and its subclasses). This class TDeviceColor (Block 60) serves as an interface defining a virtual abstract base class and a container class for device-dependent or uncalibrated color space, as described more fully below. Each class TColor (Block 58) and class TDeviceColor (Block 60) being an abstract base class, means that these classes are written such that their subclasses add to the class structure (data) and behavior (member functions).

In addition to the above-described general properties, the color architecture 54 has one or more of the following specific properties:

1. The architecture 54 processes every color in relation to a color space, calibrated or uncalibrated, such as Lab or HSL, respectively.
2. The architecture 54 processes colors that are or may be transformed to calibrated colors.
3. Every color can "set" itself from a given uncalibrated color such as RGB color and a given calibrated color such as XYZ color.
4. Every color can "set" itself with a given uncalibrated color such as RGB color and a given calibrated color such as XYZ color.
5. Every color can "set" itself from a TColor.
6. Every color can construct itself with a TColor.
7. The architecture 54 can support any peripheral device 14 which knows what colors the device 14 can produce/record, i.e., what its color gamut CG is.
8. The architecture 54 can support any peripheral device 14 which knows how ideal the device 14 is, i.e., what its tonal reproduction curve TRC is.

Since every color is processed in relation to a color space this means that the color is well defined and that a transformation may exist into and out of its space. Also, since all colors are or may be transformed into a calibrated color, it is possible to transform a color from one space to another space correctly. This does not imply that a device 14 can produce that color. If the color of the device 14 which is a source, such as monitor 16, is out of gamut to the color gamut of a device 14 which is the destination, such as printer 34, then a color matching algorithm should be employed. Color matching will be non-reciprocal if the destination color gamut is not equal to or contained in the source color gamut.

In using the color architecture 54, there should be at least one color space that all colors can transform into or out of. As an example, this is chosen to be the XYZ color space, since this space contains all of the known visible colors. From a practical point, however, the choice of XYZ as the one color space that all colors can transform into and out of may not be entirely satisfactory. An additional color space that is utilized is the RGB color space. This is because almost all uncalibrated colors can transform themselves into and out of the RGB color space using well-known transformation algorithms. From a practical standpoint, therefore, the architecture 54 supports the additional processing that each color can set/get itself with or from XYZ color space and with or from RGB color space.

FIG. 6A illustrates pictorially the transformation provided by the architecture 54 from a given uncalibrated color into a color in XYZ color space. FIG. 6B illustrates pictorially the transformation provided by the architecture 54 from a given calibrated color to RGB color space. Thus, as shown in FIG. 6A, an uncalibrated color in ColorSpace1 may be transformed to an uncalibrated color such as RGB color in RBG color space using a known transformation algorithm and then into a calibrated XYZ color of XYZ color space using a known transformation algorithm. As shown in FIG. 6B, a calibrated color in ColorSpace2 may be transformed to an XYZ color in XYZ color space using a known transformation algorithm, and then into an RGB color in RGB color space using a known transformation algorithm.

Furthermore, the term "uncalibrated" color spaces, which is used throughout this specification, is used in connection with color spaces that are not CIE based. That is, "uncalibrated" refers to color spaces that are known (RGB, HSV, HSL, CMY, CMYK) but do not have a clearly defined representation in a CIE space, e.g., calibrated space such as XYZ. Colors, as mentioned above, in one of these uncalibrated spaces is usually dependent on the device 14 from which it came or on which it is displayed (rendered). For example, saturated red from one RGB space or device 14 might have the value 1.0, yet it would not necessarily match saturated red from another RGB space or device 14 even though the latter might also have the same value 1.0. For this reason any two uncalibrated colors are considered to be in different color spaces even though they might be the same class. For example, if color A and color B are both RGB colors, they may actually be in different color spaces if they came from different devices 14. The architecture of the present invention automatically supports handling of these color objects, without requiring a client using them to know anything about their origin.

There will now be described briefly the color classes of the color operating systems architecture 54 of the present invention shown in FIG. 5. The interfaces are disclosed in more detail in the .h or header files used in the C++ programming language with file names the same as the class name (without the T), as shown in Appendix A attached to this specification.

MCollectible (Block 62)

The class identified as MCollectible (Block 62) defines a generic object class from which all other classes are derived. It is an abstract class in that many subclasses will redefine (i.e., add to or modify) some or all of the method functions that are a part of the declaration of this class (Block 62). All of the color classes shown in FIG. 5 redefine the following method functions of MCollectible (Block 62) so that they function properly:

---
IsEqual
operator =
operator > > = Streaming
operator < < = streaming

---

TAttribute (Block 64)

Attributes are a generic term for characterizing and sharing certain object properties. Attributes provide a way for colors and color characteristics to be shared across different tasks, and to be pooled for common usage by all users of the architecture 54. Thus, class TAttribute (Block 64) is a base class for managing the sharing process, and may be included in the architecture 54 when or if such sharing is desirable.

Class TColorGamut (Block 66)

Class TColorGamut (Block 66) descends from class TAttribute (Block 64) and stores color gamut CG information of each peripheral device 14 interfacing with the data processor 12. As previously indicated, color gamuts are used to properly convert colors of one peripheral device (monitor 16, for example) to another peripheral device (printer 30, for example). Although colors are converted using color gamuts, this does not guarantee that the transformation is within the gamuts. To insure that colors are within gamuts, a given color matching algorithm may be used. Color matching method functions performing the matching algorithm are contained in a class TColorProfile (Block 68 described below).

A color gamut CG for the calibrated color space XYZ is defined by eight XYZ points in XYZ space. These are Cyan, Green, Yellow, Red, Magenta, Blue, Black, and White. In general each peripheral device 14: color printer, color scanner, color monitor etc., has its own color gamut CG as shown, for example, in FIG. 2 and this color gamut information should be specified by the device manufacturer. The class TColorGamut (Block 66) stores two constructors, one being a null constructor which defines, for example, a 13" Apple RGB monitor manufactured by Apple Computer, Inc., Cupertino, California, and the other being a file constructor which takes as its argument a file name that contains the color gamut CG. (A constructor is a method function that creates an object and/or initializes its state.)

The class TColorGamut (Block 66) contains a template for assisting programmers to write .h or header files to store this color gamut information. Upon adding a new peripheral device 14 to the data processor 12, as will be discussed below, its unique color gamut data may be added to the class TColorGamut (Block 66) using this template.

TColorProfile (Block 68)

Class TColorProfile (Block 68) descends from class TColor Gamut (Block 66) and stores color profile data for each peripheral device 14 added to processor 12. In addition, class TColorProfile (Block 66) has a mechanism to "get" a given color matcher algorithm in class TColorMatcher (Block 70) (discussed more fully below in connection with color matching) for executing one or more types of color matching algorithms, which uses the color gamut CG information of class TColorGamut (Block 66) and the color profile information of class TColorProfiles (Block 68). The class TColorProfile (Block 68) contains a template assisting programmers to write header files to store this color profile information as a new peripheral device 14 is coupled to the data processor 12. A class TAppleColorProfile (Block 72) which descends from class TColorProfile (Block 68) is also shown in FIG. 5 (described more fully below in connection with color matching).

As an example, a color profile for a given peripheral device 14 comprises seven Tonal Reproduction Curves (TRCs) for seven colors, respectively: Cyan, Green, Yellow, Red, Magenta, Blue and Black. In other words, while for ease of explanation FIG. 3 illustrated a TRC for only the color red for two different peripheral devices 14, class TColorProfile (Block 68) stores these seven TRC's for each respective peripheral device 14. The TRC's for each such device 14 may be measured experimentally and, as with the color gamut information, specified by the manufacturer of the device 14, with the TRC data corresponding to the TRC curves then being stored in class TColorProfile (Block 68). As another example, for a color monitor such as device 16, the TRC's may default into a single curve known as a gamma correction curve.

Class TColorProfile (Block 68) also stores two constructors, one such constructor being a null constructor which defines the color profile of a given peripheral device 14, such as the color profile of a 13" RGB monitor manufactured by Apple Computer, Inc. The other constructor is a file constructor which takes as its argument a file name which contains a color profile.

Class TColor (Block 58)

As described above, class TColor (Block 58) constitutes one level of architecture 54 and is both an interface defining a virtual abstract base class and a container class for calibrated colors. In the color architecture 54, since a given color can be transformed into an uncalibrated RGB color (device dependent) and/or a calibrated XYZ color (device independent), the class TColor (Block 58) has at least three pure virtual member functions, which are:

```
GetXYZColor(TXYZColor& aXYZColor)
GetRGBColor(RGBColor& aRGBColor) const
SetColor( const TColor& aColor)
```

These method functions insure that all color classes derived from Class TColor (Block 58) will support this functionality pursuant to object orient design principles. Also, class TColor (Block 58) has fields for the components of a given color. The field components of an XYZ color are of the type TristimulusCoord which may take on all of the values that floating points do. The field components of an RGB color are of the type Gintensity which is of a range between 0.0 and 1.0. In addition, class TColor (Block 58) may have an opacity field, in which an opacity value of 1.0 means the color is purely opaque while an opacity of 0.0means the color is transparent.

Class TXYZColor (Block 58A)

Class TXYZColor (Block 58A) descends from Class TColor (Block 58). Every color which is derived from class TColor (Block 58), pursuant to the architecture 54 of the present invention as described more fully below, is able to convert or transform itself to the calibrated XYZ color.

Class TSpectralColor (BLOCK 58Aa)

Figure 7:
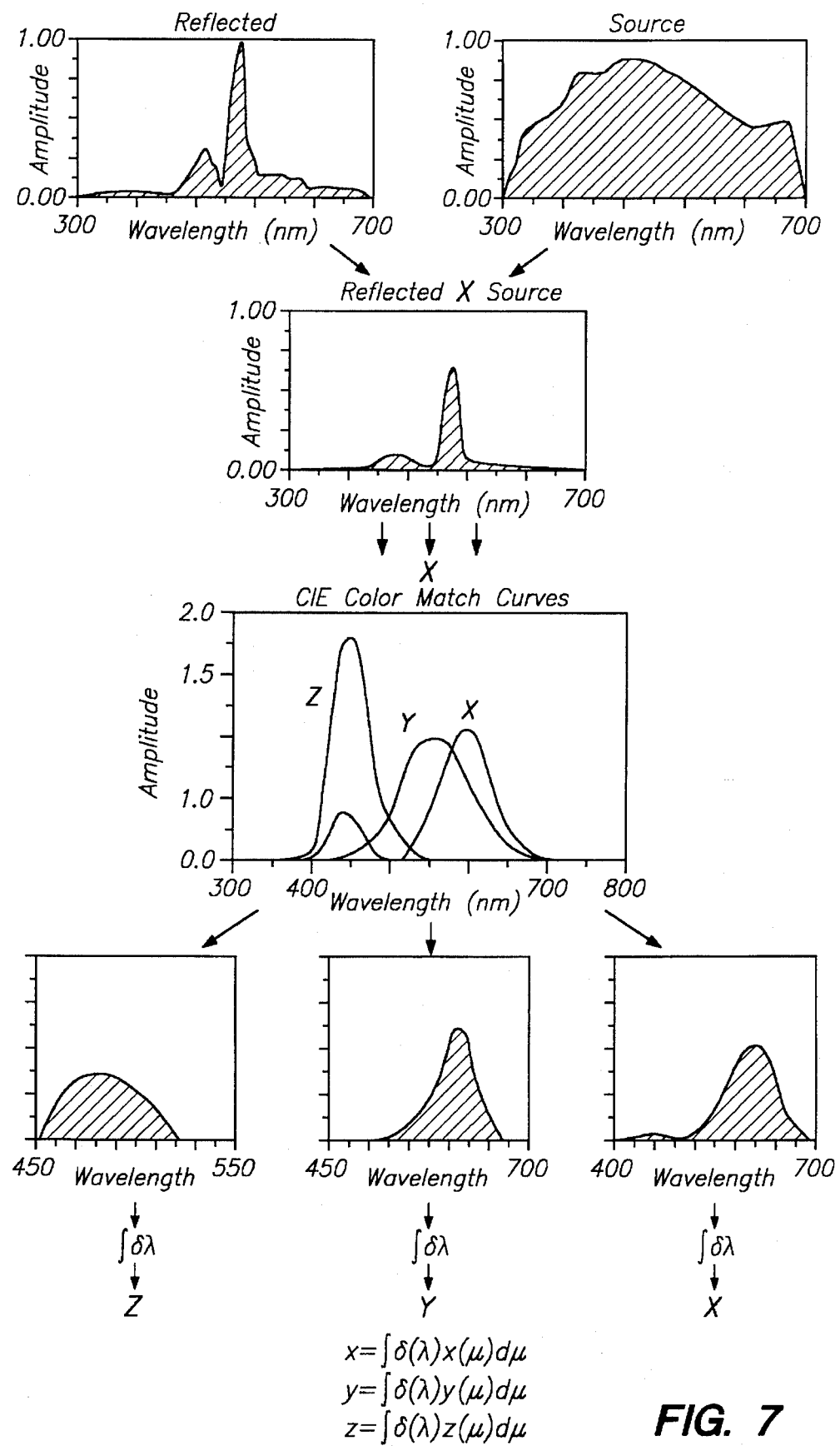
FIG. 7 illustrates CIE color matching functions.

Class TSpectralColor (Block 58Aa) descends from Class TXYZColor (Block 58A). The TSpectralColor class stores method functions that use the known three CIE color-matching functions represented by the three integral equations (1), (2) and (3), as shown in FIG. 7. In these respective equations, $\delta\lambda$ is the spectral energy distribution of the color being matched and $X(\mu)$, $Y(\mu)$ and $Z(\mu)$ are experimentally determined color matching functions. These functions define the color matching properties of the CIE 1931 Standard Calorimetric Observer for a 2 degree field of view as described in the above-referenced materials. Thus, the CIE color-matching member functions of Class TSpectral Color (Block 58Aa) are used as weighting functions to enable X, Y, and Z primaries to be obtained from spectral power data, as shown graphically in the example of FIG. 7 for calculating XYZ from the spectral information. The class TSpectralColor (Block 58Aa) stores the three CIE spectral color matching power curves X,Y and Z shown in FIG. 7 as static arrays which are initialized by a null constructor for this class.

Class TLabColor (Block 58B)

Class TLabColor (Block 58B) descends from Class TColor (Block 58). TLabColor is a class which defines a uniform tristimulus device calibrated color space whose values also have been standardized internationally by the CIE. Two of the dimensions (a and b) are coordinates on a uniform chromaticity diagram. L is the psychometric lightness. The TLabColor class (Block 58B) is used to express colors in perceptually linear fashion and the perceptual distance between colors is proportional to the geometric distance between colors. The TLabColor class has three static fields which are used to define reference white color. Reference white may be used to transform a TLabColor to a TXYZColor. Default is reference white. Member functions of this class TLabColor (Block 58B) execute correlates of lightness, chroma, saturation and color-difference.

Class TLuvColor (Block 58C)

Class TLuvColor (Block 58C) descends from class TColor (Block 58). TLuvColor is a class which also defines a uniform tristimulus device calibrated color space whose values have been standardized internationally by the CIE. Two of the dimensions (u and v) are coordinates on a uniform chromaticity diagram. L is the psychometric lightness. The TLuvColor class is used to express colors in perceptually linear fashion and the perceptual distance between colors is proportional to the geometric distance between colors. The TLuvColor class (Block 58C) has three static fields which may be used to define reference white color, which is used to transform a TLuvColor to a TXYZColor. Default is reference white. Member functions of this class TLuvColor (Block 58C) execute correlates of lightness, chroma, saturation and color-difference.

Peripherals 14 such as industrial color measurement equipment make use of the CIE color system (the calibrated system). This CIE system allows color to be specified in terms of the light source, the object and the observer in a way that is independent of input and output devices. Accordingly, the architecture 54, if desired by a user, will transform the tristimulus values XYZ which uniquely define a color, into either color Lab coordinates or color Luv coordinates. The Lab coordinates may be used for devices 14 viewed by reflected light, while the Luv coordinates may be used for self-luminous peripheral devices 14 such as light sources.

Class TxyYColor (Block 58D)

Class TxyYColor (Block 58D) descends from class TColor (Block 58). The color space xyY can be derived from the color space XYZ of class TXYZColor (Block 58A). The transformation between space XYZ and space xyY are as follows.

Transformation XYZ—to—xyY:

$$x=\frac{x}{x+y+z}, y=\frac{y}{x+y+z} \quad z=\frac{z}{x+y+z}$$

Transformation xyY—to—XYZ:

$$x=x\left(\frac{Y}{y}\right), Y=Y, Z=(1-x-y)\left(\frac{Y}{y}\right)$$

Class TDeviceColor (Block 60)

Class TDeviceColor (Block 60) descends from Class TColor (Block 58) and, as mentioned above, constitutes another level of the 2-level architecture 54. Class TDeviceColor (Block 60) is both an interface defining a virtual abstract base class and a container class for uncalibrated colors in the architecture 54. TDeviceColor contains a construct reference to class TColorGamut (Block 66). This class has at least three pure virtual member functions so that all device dependent or uncalibrated colors are able to convert or transform to both an uncalibrated RGB color of class TRGBColor (Block 60A) (described below) and a calibrated XYZ color of class TXYZColor (Block 58A). These member functions are:

```
GetXYZColor(TXYZColor& aXYZColor)
GetRGBColor(RGBColor& aRGBColor) const
SetColor( const TColor& aColor)
```

These member functions insure that all color classes derived from TDeviceColor (Block 60) will support this functionality. As previously indicated, in order for the transformation to take place a color gamut CG which is dependent on the particular device 14 that the color is defined with respect to should be known and stored in class TColorGamut (Block 68).

Class TRGBColor (Block 60A)

Class TRGBColor (Block 60A) class defines the Cartesian coordinate (Block 60). The TRGBColor class defines the Cartesian coordinate based color model of red (R), green (G), and blue (B). The RGB primaries are additive and used for most color monitors and color raster graphic systems. Values of the three RGB primaries should be constrained to the range of 0.0<primary<1.0. Member functions of this class are provided to clamp the RGB primaries to this range. The RGB color space is uncalibrated; therefore RGB colors must be defined with respect to a particular color device 14 through its color gamut CG.

Class TCMYKColor (Block 60B)

Class TCMYKColor (Block 60B) descends from Class TDeviceColor (Block 60). The TCMYKColor class defines a color space of cyan (C), magenta (N), yellow (Y), and black (K), which are subtractive primaries used for most color hard copy devices such as printer 36. The CMYK values are calculated by first determining CMY values present in a color. The amount of black present in the color is determined by the relationship K=minimum (C, M, Y). K is then subtracted from CMY values to define the CMYK values. This technique is called under color removal and enables hard copy color devices to increase output quality by printing with four instead of three colors. Values of the four primaries CYMK are constrained to the range of 0.0<primary<1.0. The class TCMYKColor (Block 60B) contains member functions which clamp the CMYK primaries to this range. Since the CMYK color model is uncalibrated, CMYK colors are defined with respect to the color gamut CG of a particular color device 14 such as the printer 36.

Class THSLColor (Block 60C)

Class THSLColor (Block 60C) descends from Class TDeviceColor (Block 60) and defines the well-known color model HSL. The hue (H), lightness (L), and saturation (S) color model (HSL) is defined by a double-hexcone in three dimensional space as shown in the references mentioned above. Hue is measured by the angle around the L axis. Red occurs at H=0.0. Transversing the perimeter in a counter-clockwise direction yields: red, yellow, green, cyan, blue, and magenta. A colors complement may be obtained by adding 180 degrees to the H value. Saturation is measured radially from the vertical axis, ranging from 0.0 to 1.0. Lightness is 0 for black (bottom of double hex-cone) to 1.0 (top of hex-cone). The HSL color model is uncalibrated color space and therefore HSL colors are defined with respect to a particular color peripheral device 14 through its color gamut CG stored in class TColorGamut (Block 66).

Class THSLColor (Block 60D)

Class THSVColor (Block 60D) descends from Class TDeviceColor (Block 60). The hue (H), saturation (S) and value (V) color space (also sometimes called HSB where B stands for brightness) is defined in relation to the artistic concepts of tint, shade, and tone. As described in the above-referenced publications, the HSV model forms a hexcone in three dimensional space. Values of V=1.0, corresponds to relatively bright colors. Hue or the H coordinate is measured by the angle around the V axis. H=0.0 is red, green is 120 degrees etc. A colors complement may be obtained by adding 180 degrees to the H value. The saturation value S is defined as the ratio (ranging between 0 and 1.0). Saturation is measured relative to the color gamut. The HSV color model also is uncalibrated and therefore HSV colors are defined with respect to a particular color peripheral device 14 through its color gamut CG stored in class TColorGamut (Block 66).

CLASS TGrayColor (Block 60E)

Class TGrayColor (Block 60E) descends from class TDeviceColor (Block 60). The TGrayColor class defines the gray scale model in which values of gray may be constrained to the range of 0.0<primary <1.0. The class contains member functions to clamp the gray values to this range. The gray scale color model is uncalibrated so that gray colors are defined with respect to the color gamut CG of a particular color peripheral device 14.

Adding a New Color Class

As part of the extensibility of the architecture 54, additional color classes can be added as new color models are developed. For example, assume a new calibrated color space ABC is developed. To represent a color in this calibrated color space ABC, a new color class TNewCalColor (TABCColor in the example) (shown in dotted lines in FIG. 5) is defined that descends and inherits from class TColor (Block 58). The method functions of this new class TNewCalColor may then be written by a programmer as part of the class definition to tranform color ABC to and from XYZ color space and the other color spaces provided by Class TColor (Block 58).

As one specific example, Tektronix Corp. of Beaverton, Oregon, has developed a calibrated color space HVC and conversion methods for transforming this space into other space. This color space HVC is easily accommodated by the extensibility of the architecture 54 by defining a class THVCColor (not shown) that descends from class TColor (Block 58) for which such published conversions or transformations are provided as a part of this class definition. The color transformation is defined by the calibrated color space being added to architecture 54, but interfaces with the rest of the architecture 54 as a TColor base class object. In a similar manner, new uncalibrated color classes that are developed can be added by defining a class TNewDeviceColor (shown in dotted lines in FIG. 5) descending and inheriting from class TDeviceColor (Block 60).

As part of the appendix A to this specification, template classes are disclosed for adding new classes. These template classes may be used by programmers to write the header files for adding such new classes. For TNewCalColor, for example, the header file TCalColor of the appendix may be used as the template. For TNewDeviceColor, the header file TDev3Color of the appendix may be used as the template.

There will now be provided a more detailed description than given above of the method functions in class TColor (Block 58) and class TRGBColor (Block 60A) shown in FIG. 5.

| Class TColor (Block 58) |
|---|
| Gets |
| GIntensity GetOpacity();<br>Simply returns the value of the opacity field.<br>GetXYZColor(TXYZColor& aXYZColor) = 0; |

Each subclass may override this method function. Each subclass should know how to get a XYZColor from itself.

| |
|---|
| GetRGBColor(TRGBColor& aRGBColor)<br>GetLuvColor(TLuvColor& aLuvColor)<br>GetLabColor(TLabColor& aLabColor)<br>GetGrayColor(TGrayColor& aGrayColor)<br>GetCMYKColor(TCMYKColor& aCMYKColor)<br>GetHLSColor(THLSColor& aHLSColor)<br>GetxyYColor(TxyYColor& axyYColor)<br>GetHSVColor(THSVColor& aHSVColor)<br>GetYIQColor(TYIQColor& aYIQColor)<br>GetDEV3Color(TDEV3Color& aDEV3Color)<br>GetCALColor(TCALColor& aCALColor) |

These method functions are stored in class TColor (Block 58) for efficiency, and subclasses can override any of these. Each one of the color space subclasses that descend from class TColor (Block 58) should override method functions in its own class. For instance, class THSVColor (Block 58D) should override GetHSVColor stored in class TColor (Block 58) in order to avoid an intermediate conversion to a calibrated color XYZ so as to save conversion time.

| |
|---|
| GetTransformedColor(TColor& aColor) const; |

This method function always "gets" using the intermediate transformation to XYZ color space. Thus, this method function should be used if the colors are in the same color space, such as RGB, but have different color gamuts CG.

| Returns | |
|---|---|
| TRGBColor | ReturnRGBColor()const; |
| TLuvColor | ReturnLuvColor()const; |
| TLabColor | ReturnLabColor()const; |
| TGrayColor | ReturnGrayColor()const; |
| TCMYKColor | ReturnCMYKColor()const; |
| THLSColor | ReturnHLSColor()const; |
| TxyYColor | ReturnxyYColor()const; |
| THSVColor | ReturnHSVColor()const; |
| TYIQColor | ReturnYIQColor()const; |
| TDEV3Color | ReturnDEV3Color()const; |
| TCALColor | ReturnCALColor()const; |

These method functions are stored in class TColor (Block 58) for efficiency, but subclasses can override any of these. Each one of the color space subclasses that descends from class TColor (Block 58) can override the method functions in its own class. For instance, class THSVColor (Block 60D) may override method function ReturnHSVColor in class TColor (Block 58) in order to avoid an intermediate conversion to XYZ.

| Index |
|---|
| long FindListIndex(TColorList& colors)const; |

This method function finds the closest match in a colorlist. Subclasses can override this method function to invoke TColorList methods that take a specific brand of TColor subclass.

| Sets |
|---|
| SetOpacity ( GIntensity opacity );<br>Sets the opacity.<br>ClampOpacity();<br>Pins the Opacity to 0.0-1.0<br>SetWithXYZColor(const TXYZColor& aXYZColor) = 0; |

Each subclass can override this method function, since each color knows how to set itself with an XYZColor.

| |
|---|
| SetColor(const TColor& aColor); |

This method function is used for polymorphism. Each color should be able to "set" itself polymorphically with a TColor. When overriding SetColor, a client uses a color to get its XYZ equivalent, then converts that XYZ equivalent to its own format (which it already knows how to do), and then sets its own data fields accordingly.

| |
|---|
| SetWithRGBColor(const TRGBColor& aRGBColor);<br>SetWithLuvColor(const TLuvColor& aLuvColor);<br>SetWithLabColor(const TLabColor& aLabColor);<br>SetWithGrayColor(const TGrayColor& aGrayColor);<br>SetWithCMYKColor(const TCMYKColor& aCMYKColor);<br>SetWithHLSColor(const THLSColor& aHLSColor);<br>SetWithxyYColor(const TxyYColor& axyYColor);<br>SetWithHSVColor(const THSVColor& aHSVColor);<br>SetWithYIQColor(const TYIQColor& aYIQColor);<br>SetWithDEV3Coior(const TDEV3Color& aDEV3Color);<br>SetWithCALColor(const TCALColor& aCALColor); |

For efficiency, subclasses of class TColor (Block 58) can override any of these. For instance, THLSColor (Block 60C) can override SetWithHLSColor in order to avoid an intemediate conversion to color XYZ.

TRGBColor Class (Block 60A)

The class TRGBColor (Block 60A) represents a typical device dependent color class storing the following method functions.

Constructors

The following describe class constructors. When they are called in the code implementing architecture 54, they create a new instance of a TRGBColor object.

| |
|---|
| TRGBColor() |

This constructor is a null constructor. The "null" implies that it needs no arguments to make an RGB color, which has two ramifications. All of the fields in the color are set to zero. fRed=fGreen=fBlue, and fOpacity=1.0, and the color gamut CG used is also null (see constructor under description of class TColorGamut)

```
TRGBColor( TColor& aColor)
TRGBColor( TDeviceColor& aDeviceColor)
```

These constructors allow the creation of an RGBColor polymorphic from any calibrated TColor such as LabColor or any uncalibrated TDeviceColor. If an uncalibrated color is used in the construction then the RGBColor has its fields (fRed...fOpacity) transformed to the RGB color space from the aDeviceColor Space such as the color space of peripheral device 16. The RGBColor inherits the color gamut CG of the aDeviceColor. On the other hand if a TColor such as Lab is used in the construction then the RGBColor ends with the fields transformed as above and the null color gamut is assigned to the new color. These constructors are also used for type casting such as: aRGBColor=(TRGBColor) SomeOtherColorSpace.

```
TRGBColor( TRGBColor& aRGBColor)
```

This constructor is a copy constructor because it creates a new RGBColor object from aRGBColor. The created object has the same fields and color gamut CG as aRGBColor.

```
TRGBColor(TColorGamut* theDeviceColorGamut)
```

All of the fields in the new color are set as follows: fRed=fGreen=fBlue=0, fOpacity=1.0 and the color gamut CG is set to theDeviceColorGamut.

```
TRGBColor(Red, Green,Blue, opacity = 1.0);
```

All of the fields in the new color are set as follows: fRed=Red,fGreen=Green, fBlue=Blue. The opacity is set to 1.0 if none is supplied or to the value supplied. The color gamut CG is set to the null color gamut.

```
TRGBColor(TColorGamut* theDeviceColorGamut,Red,
Green,Blue,opacity = 1.0);
```

All of the fields in the new color are set as follows: fRed=Red,fGreen=Green, fBlue=Blue. The opacity is set to 1.0 if none is supplied or to the value supplied. The color gamut is set to theDeviceColorGamut.

```
GetXYZColor(TXYZColor& aXYZColor);
GetRGBColor(TRGBColor& aRGBColor);
GetGrayColor(TGrayColor& aGrayColor);
```

A get, as the name implies, gets the specified color object from the color object. For example, the member function GetXYZColor does the necessary transformation to the RGBColor object to return the aXYZColor.

```
GetComponents(Red, Green, Blue, opacity);
GetAll( Red,Green,Blue, opacity,theColorGamut);
GetClampedComponents(Red, Green, Blue,opacity);
GIntensity GetRed();
GIntensity GetGreen();
GIntensity GetBlue();
```

The GetComponents simply read the component values from the object and return them in variables Red, Green, Blue, and opacity.

| Returns | |
|---|---|
| TRGBColor | ReturnRGBColor(); |

The ReturnRGBColor returns an exact duplicate of the RGBColor object: fields and color gamut.

```
SetWithXYZColor( TXYZColor& aXYZColor);
SetWithRGBColor( TRGBColor& aRGBColor);
SetWithGrayColor( TGrayColor& aGrayColor);
```

Each SetWith, as its name implies, sets the RGB color object from the specified color object. For example, the member function SetWithXYZColor does the necessary transformation to make the RGBColor from an aXYZColor and uses this color to set the RGBColor values. The color gamut CG is set to the null gamut for this particular case only.

```
SetAll(TColorGamut* theDeviceColorGamut,Red,
Green, Blue, opacity = 1.0);
SetComponents(Red,Green,Blue,opacity = 1.0 );
SetRed(GIntensity Red);
SetGreen(GIntensity Green);
SetBlue(GIntensity Blue);
```

These are simple sets. Values passed are used to set the object values.

SetColor( TColor& aColor);

The SetColor is defined so that RGB Colors can be set polymorphic from any type of TColor.

| RGBColor Math |
|---|
| operator < = ( TRGBColor& Color1, TRGBColor& Color2); |
| operator < ( TRGBColor& Color1, TRGBColor& Color2); |
| operator > ( TRGBColor& Color1, TRGBColor& Color2); |
| operator > = ( TRGBColor& Color1, TRGBColor& Color2); |
| operator! = (TRGBColor& Color1, TRGBColor& Color2); |
| friend TRGBColor operator + ( TRGBColor& Color1, TRGBColor& Color2); |
| friend TRGBColor operator – ( TRGBColor& Color1, TRGBColor& Color2); |
| friend TRGBColor operator* ( TRGBColor& Color1, float aScalar ); |
| friend TRGBColor operator/ ( TRGBColor& Color1, float aScalar ); |
| friend TRGBColor operator* (float aScalar, TRGBColor& Color1); |
| friend TRGBColor operator/ ( flato aScalar, TRGBColor& Color1); |
| TRGBColor& operator + = ( TristimulusCoord aScalar); |
| TRGBColor& operator = ( TristimulusCoord aScalar); |
| TRGBColor& operator* = ( float aScalar); |
| TRGBColor& operator/ = ( float aScalar); |
| TRGBColor& operator = ( TRGBColor& Source); |

These method functions override the standard operators in C++so that they are defined properly for RGB colors. The logical operators return a TRUE if and only if the condition holds for each field component of the Color1 and Color2 including the opacity. The remaining operators perform the stated math function on each individual field component except for opacity.

EXAMPLES OF WORKING WITH COLOR

This section contains some examples of using color with the architecture 54. Most of the examples are given using an RGBColor for the device dependent or uncalibrated color or an XYZColor for the device independent or calibrated color. The NullGamut and NullProfile, as previously mentioned, may be defined to be the gamut and profile of a standard 13" color monitor manufactured by Apple Computer, Inc.

The field components RGB of an RGBColor, as previously indicated, are of the type Gintensity which implies a range between 0.0 and 1.0. However, this constraint need not be strictly enforced. Thus, during transformations on the color, especially colors with different gamuts, it is possible to have field component values outside of this range.

Examples of Making Colors

Below are examples of six (6) constructors. If called, then the state of the object is as given as follows:

```
(1) TRGBColor aRGBColor;
    State:
        fRed = fGreen = fBlue = 0.0;
        fOpacity = 1.0;
        fColorGamut = NullGamut;
(2) TRGBColor(0.5,0.7 ,0.3, 0.5);
    State:
        fRed = 0.5; fGreen = 0.7; fBlue 0.3;
        fOpacity = 0.5;
        fColorGamut = NullGamut;
(3) TRGBColor(theDeviceColorGamut, Red, Green, Blue);
    State:
        fRed = Red; fGreen = Green; fBlue = Blue;
        fOpacity = 1.0 (set by default);
        fColorGamut = theDeviceColorGamut;
(4) TRGBColor aRGBColor(aRGBColor);
    State:
        fRed = aRGBColor.fRed;
        fGgreen = aRGBColor.fGreen;
        fBlue = aRGBColor.fBlue;
        fOpacity = aRGBColor.fOpacity;
        fColorGamut = aRGBColor -> fColorGamut;
(5) TRGBColor aRGBColor(theDeviceColorGamut);
    State:
        fRed = fGreen = fBlue = 0.0;
        fOpacity = 1.0;
        fColorGamut = theDeviceColorGamut;
(6) TRGBColor aRGBColor(aDeviceColor);
```

The following equivalent process takes place in this construction. Since this is a device dependent color, it has a color gamut CG. In addition all colors know how to get an RGB color from themselves. Thus,

```
TRGBColor aTempRGBColor;
aDeviceColor.GetRGBColor(aTempRGBColor);
State:
    fRed = aTempRGBColor.fRed;
    fGreen = aTempRGBColor.fGreen;
    fBlue = aTempRGBColor.fBlue;
    fOpacity = aDeviceColor.fOpacity;
    fColorGamut = aDeviceColor-> fColorGamut;
```

Examples of Sets and Gets

This section illustrates how to use some of the sets and gets to work with color. In the following examples, let the following colors be defined:

```
TXYZColor aXYZColor(20,80,90); TRGBColor aRGBColor1
(1.0,0.0,0),aRGBColor2(0.0,1.0,0.0);
TRGBColor aRGBColorGamut2(< GHT_ColorGamut);
```

Setting an XYZColor with an RGBColor aXYZColor.SetWithRGBColor(aRGBColor1);

The color aXYZColor now has the correct XYZ values corresponding to aRGBColor1 with a NullGamut. If the following is now performed:

```
aXYZColor.GetRGBColor(aRGBColor2);
```

Then the state of aRGBColor2 is:

```
fRed = 1.0;
fGreen = 0.0;
fBlue = 0.0;
fOpacity = 1.0;
fColorGamut = NullGamut;
```

Getting an RGBColor from another RGBColor
If the following is performed:

```
aRGBColor1.GetRGBColor(aRGBColorGamut2);
```

Then the state of aRGBColorGamut2 is:

```
fRed = 1.0;
fGreen = 0.0;
fBlue = 0.0;
fOpacity = 1.0;
fColorGamut = NullGamut;
```

Examples of Using Simple Math on Colors

All of the color classes in the architecture 54 have a robust set of simple math defined for them. In the examples below, the following XYZ colors are defined:

```
TXYZColor aXYZColor1(0.2,0.1,0.1,0.3);
TXYZColor aXYZColor2(0.3,0.2,0.2,1.0);
TXYZColor aXYZColor3;
```

For logical operations each individual field of the color must meet the logical condition for the expression to be evaluated to be TRUE, thus

```
aXYZColor1 < = aXYZColor2 would yield TRUE
aXYZColor1 < = aXYZColor2 would yield TRUE
aXYZColor1 > aXyzColor2 would yield FALSE
aXYZColor3 = aXYZColor1 + aXYZColor2;
    if aXYZColor3 before the sum operation was:
        fX = 0.0
        fY = 0.0
        fZ = 0.0;
        fOpacity = 1.0;
    aXYZColor3 after the sum operation will be:
        fX = 0.5
        fY = 0.3
        fZ = 0.3;
        fOpacity = 1.0;
```

The opacity of the color does not enter into mathematical calculations.

```
aXYZColor3 = aXYZColor1 - aXYZColor2;
  if aXYZColor3 before the subtraction operation was:
    fX = 0.0
    fY = 0.0
    fZ = 0.0;
    fOpacity = 1.0;
aXYZColor3 after the subtraction operation will be:
    fX= -0.1
    fY= -0.1
    fZ= -0.1;
    fOpacity = 1.0;
aXYZColor3 = 0.5*aXYZColor1;
  if aXYZColor3 before the multiplication operation was:
    fX = 0.0
    fY = 0.0
    fZ = 0.0;
    fOpacity = 1.0;
aXYZColor3 after the multiplication operation will be:
    fX = 0.1
    fY = 0.05
    fZ = 0.05;
    fOpacity = 1.0;
aXYZColor3 = aXYZColor 1/0.5*;
  if aXYZColor3 before the division operation was:
    fX = 0.0
    fY = 0.0
    fZ = 0.0;
    fOpacity = 1.0;
aXYZColor3 after the division operation will be:
    fX = 0.4
    fY = 0.2
    fZ = 0.2;
fOpacity = 1.0;
```

EXAMPLES OF USING POLYMORPHISM WITH COLORS

All of the color classes descend from the base class TColor (Block 58). It is possible to write polymorphic functions and method functions that take as their arguments TColors. Examples to show how this may work are now given.

Determining the Hue Difference Between Colors

The method function which follows takes as input two TColors and returns the hue difference between those colors. The hue difference is a precisely defined quantity for either the Lab or Luv color spaces. The example below uses the Luv based definition.

```
GCoordinate HueDifference(TColor& RefColor1,TColor&
Color2)
{
//Construct two Luv Colors
TLuvColor aLuvColor1(RefColor1),aLuvColor2(Color2);
return ( RefColor1.GetHueDifferencea(Color2));
}
```

Determining the Correlate of Lightness

Another example is calculating the correlate of lightness for a color.

```
GCoordinate CorrelateOfLightness(TColor& Color1)
{
// Construct Luv Color
TLuvColor aLuvColor1(Color1)
return (aLuvColor1.GetCorrelateOfLightness() );
}
```

Color Matching Individual Colors

In general, color matching occurs when an internal color, represented in some color space, calibrated or uncalibrated, is transformed into another color space, usually uncalibrated, which closest represents the specified color on a specific device. The converse is also true. In the architecture 54 of the present invention, a color matching process or function is embodied in a color matching base class TColorMatcher (Block 70) which is accessed internally in all uncalibrated objects that descend from class TDeviceColor (Block 60) through the TColorProfile reference in each such device color class object. That is, upon such reference, TColorProfile (Block 68) has a means to "get" a color matcher container in class TColorMatcher (Block 70). A sample profile that may be used by the color matcher is shown in FIG. 5 as class TAppleColorProfile (Block 72).

The architecture 54 of the present invention does not specify one particular color matching algorithm over another. Using any common interchange applications programmer's interface ("API"), any color matching process can be dropped into or stored in the class TColorMatcher (Block 70) by the programmer. Consequently, any color matching mechanism can be accommodated by the architecture 54. A color matcher of class TColorMatcher (Block 70) is free to use the color gamut and color profile contained in the given colors to effect a color match. Client supplied color matchers dropped into the architecture 54 can interpret a systems default color profile if one is present or private information in client-supplied color profiles, when present.

Figure 8:
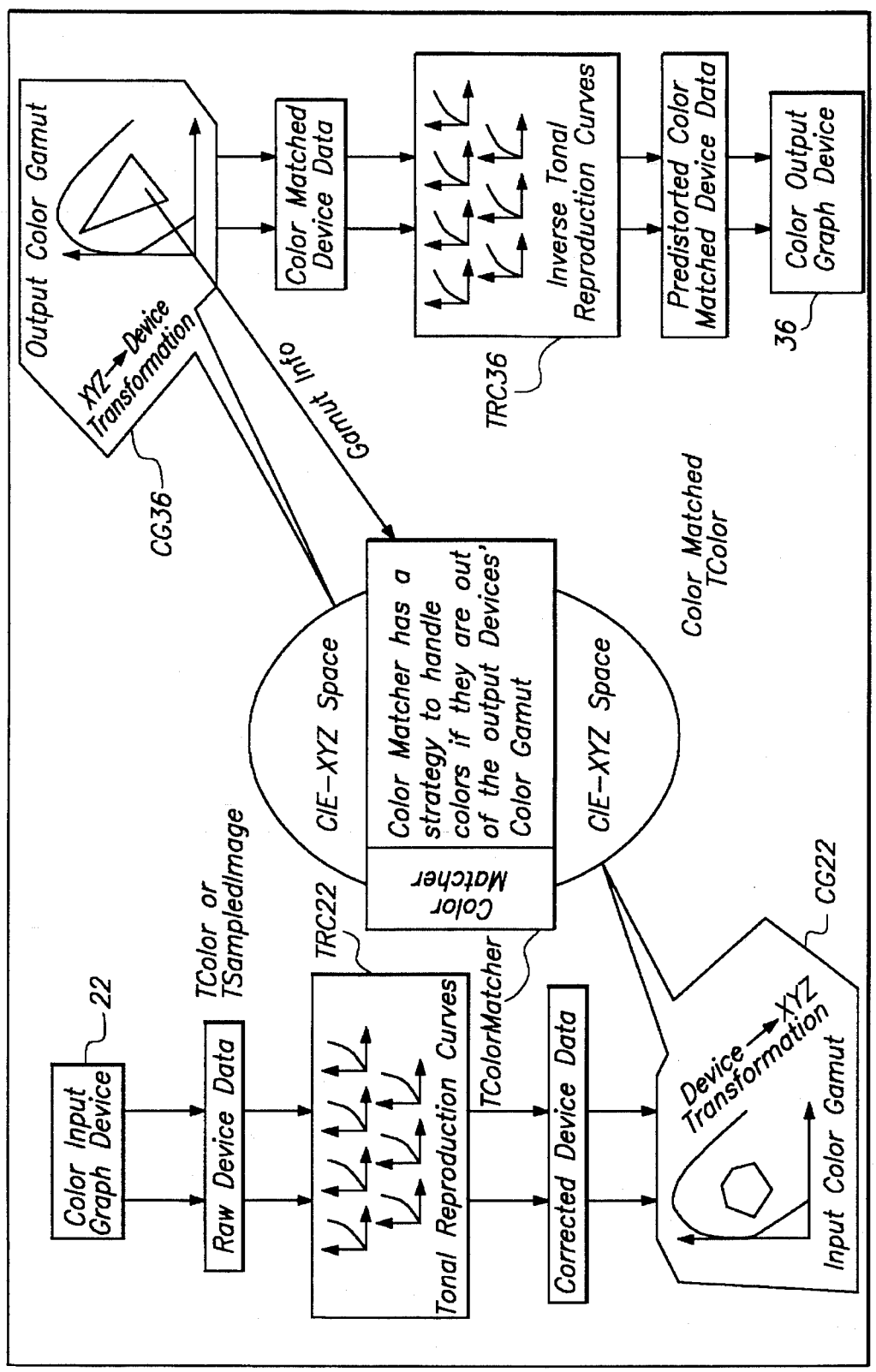
FIG. 8 shows pictorially one example of a color-matched process carried out by the present invention.

FIG. 8 illustrates pictorially the manner in which individual colors can be color matched amongst a plurality of peripheral devices 14 using the architecture 54 of the present invention. The peripheral devices shown as an example are a color device 14 such as the flatbed scanner 22 operative in a TColor such as RGB color space as an input or source device and a color device 14 such as a printer 36 operating in a TColor such as CYMK color space as an output or destination device. FIG. 8 also shows scanner tonal reproduction curves TRC22 stored as a data structure in class TColorProfile (Block 68), scanner color gamut CG22 stored as a data structure in class TColorGamut (Block 66), printer color gamut CG36 stored as a data structure in class TColorGamut (Block 66), and printer inverse tonal reproduction curves TRC36 stored as a data structure in class TColorProfile (Block 68). Also shown in FIG. 8 are color space XYZ stored as a data structure in class TColorGamut (Block 66) and a color matcher of class TColorMatcher (Block 70) for color matching between RGB color space of scanner 22 and CYMK color space of printer 36.

Generally, and with reference to FIG. 8, with the processor 12 being initialized by having the color gamut and profile information stored in architecture 54, raw color data from scanner 22, acting as a source of such color information, is inputted into the data processor 12. Then, the operating systems architecture 54 will utilize class TColor Profile (Block 68) to correct the raw RGB data using the tonal reproduction curves TRC22. The architecture then transforms the corrected RGB color data to XYZ color space by calling the color gamut CG22 of class TColorGamut (Block 66) and appropriate method functions. Then, class TColorProfile is called to get a color matcher of class TColorMatcher (Block 70) to color match the XYZ color corresponding to the RGB color device 22 to color in XYZ color space corresponding to the CYMK color of printer 36. The matched XYZ color is then transformed to CYMK color using the color gamut CG 36 and then the color matched CYMK color is predistorted by calling and using the tonal reproduction curves TRC 36 of class TColorProfile (Block 68). This predistorted color data is then transferred to the printer 36 for printing in color matched CYMK color. Thus, in accordance with the architectural features of the present invention, any peripheral device 14 can be added to processor 12 and be color matched with any other peripheral device 14.

The processing of color, including the matching of color has been described. The principles of the present invention can be extended to processing of color images in which an image may comprise not individual colors but groups or collections of colors as typically exemplified in three-color images. For example, each individual color pixel in an image may be transformed using the above described color matching process. For speed purposes, the color matching process may provide an input pixel stream (in some color class format) and return an output pixel stream (in another class format).

The foregoing description of a preferred embodiment of the object-oriented architecture 54 of the present invention has been provided for the purposes of illustration and description. It is not intended to be exhaustive or to limit the invention to the precise forms disclosed. Many modifications and variations will be apparant to practitioners skilled in the art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and then equivalents.

Appendix A

Appendix A

Below is a more detailed disclosure of module interfaces which are, as is conventional, placed in .h or header files. These module interfaces are identified immediately below by file title and a brief description, followed by more detailed listing, and include the following:

1. File: Color.h - Color used to define interfaces for class TColor (Block 58).
2. File: XYZColor.h - XYZ color used to define interfaces for class TXYZColor (Block 58A).
3. File: LabColor.h - Lab color used to define interfaces for class TLabColor (Block 58B).
4. File: RGBColor.h - RGBColor used to define interfaces for class TRGBColor (Block 60).
5. File: ColorGamut.h - Color gamut routines of class TColorGamut (Block 66).
6. File: ColorProfile.h - Color profile routine of class TColorProfile (Block 68) class TColorMatcher (Block 70), and class TAppleColorProfile (Block 72) used for color matching processes.
7. File: TCalColor.h - Calibrated color space used for adding new calibrated objects to architecture 54 (see template class TNewCalColor of Fig. 5).
8. File: TDev3Color.h - Device-dependent or uncalibrated color space used for adding new uncalibrated color objects to architecture 54 (see template class TNewDeviceColor of Fig. 5).

```
/*==========================================
//
||    File:      Color.h
//
//    What:     Color used to define interfaces for TColor
//
//                Copyright ©      Apple Computer, Inc.
//                All Rights Reserved.
//
//
//
//
//
//
//
*/ ifndef __COLOR__
define __COLOR__ ifndef __ATTRIBUTES__
include <Attributes.h>
endif typedef float GIntensity;

class TColorList;
class TXYZColor;
class TLabColor;
class TLuvColor;
class TRGBColor;
class TGrayColor;
class THSVColor;
class TYIQColor;
class THLSColor;
class TxyYColor;
class TCMYKColor;
class TDEV3Color;
class TCALColor;

class TColor: public TPaint{
public:

// === Destructor === virtual ~TColor();

//      Get the Opacity

GIntensity           GetOpacity()const;

//      Get a Opacity value Pined between 0.0 - 1.0

GIntensity           GetClampedOpacity()const;

// === Gets ===
        //      subclasses must override this method virtual void       GetXYZColor(TXYZColor& aXYZColor) const = 0;

//      Generic Transform allways "gets" through XYZ Color Space virtual void       GetTransformedColor(TColor& aColor) const;
```

```
//      For efficency, subclasses can override any of these.
//      For instance, THLSColor should override GetHLSColor
//      in order to avoid an intermediate conversion to XYZ.

virtual void    GetRGBColor(TRGBColor& aRGBColor)   const;
virtual void    GetLuvColor(TLuvColor& aLuvColor)   const;
virtual void    GetLabColor(TLabColor& aLabColor)   const;
virtual void    GetGrayColor(TGrayColor& aGrayColor) const;
virtual void    GetCMYKColor(TCMYKColor& aCMYKColor) const;
virtual void    GetHLSColor(THLSColor& aHLSColor)   const;
virtual void    GetxyYColor(TxyYColor& axyYColor)   const;
virtual void    GetHSVColor(THSVColor& aHSVColor)   const;
virtual void    GetYIQColor(TYIQColor& aYIQColor)   const;
virtual void    GetDEV3Color(TDEV3Color& aDEV3Color) const;
virtual void    GetCALColor(TCALColor& aCALColor)   const;

// === Returns ===

//      For efficency, subclasses can override any of these.
//      For instance, TRGBColor should override ReturnRGBColor()
//      {return *this)} NOTE even when over written these member functions
// are very very expensive virtual TRGBColor       ReturnRGBColor()const;
virtual TLuvColor       ReturnLuvColor()const;
virtual TLabColor       ReturnLabColor()const;
virtual TGrayColor      ReturnGrayColor()const;
virtual TCMYKColor      ReturnCMYKColor()const;
virtual THLSColor       ReturnHLSColor()const;
virtual TxyYColor       ReturnxyYColor()const;
virtual THSVColor       ReturnHSVColor()const;
virtual TYIQColor       ReturnYIQColor()const;
virtual TDEV3Color      ReturnDEV3Color()const;
virtual TCALColor       ReturnCALColor()const;

// === Indexs ===

//      Find the closest match in a colorlist.
//      Subclasses can override this method to envoke
//      TColorList methods that take a specific brand of
//      TColor subclass.

virtual long    FindListIndex(TColorList& colors)const;

virtual PaintType  GetPaintType ()const {return eSimpleColor;}    // going away

// === Sets ===

//      Sets the Opacity void                    SetOpacity ( GIntensity opacity );

//      Pins the Opacity to 0.0-1.0 void                    ClampOpacity();

//      Subclasses must override this method virtual void    SetWithXYZColor(const TXYZColor& aXYZColor) = 0;
```

```
/*==========================================
||
||   File:      XYZColor.h
||
||   What:   XYZColor used to define interfaces for TXYZColor
||
||              Copyright ©       Apple Computer, Inc.
||              All Rights Reserved.
||
||
||
||
|| .
||
*/ ifndef __XYZCOLOR__
define __XYZCOLOR__ ifndef __COLORGAMUT__
include <ColorGamut.h>
endif ifndef __COLOR__
include <Color.h>
endif class TXYZColor: public TColor{
        public:

// === Constructors ===

TXYZColor();
                TXYZColor(const TColor& aColor);
                TXYZColor(TColorGamut* theColorGamut);
                TXYZColor(
                        TristimulusCoord X,
                        TristimulusCoord Y,
                        TristimulusCoord Z,
                        GIntensity opacity = 1.0);
                TXYZColor(const TXYZColor& aXYZColor);
                TXYZColor(
                        TColorGamut* theColorGamut,
                        TristimulusCoord X,
                        TristimulusCoord Y,
                        TristimulusCoord Z,
                        GIntensity opacity = 1.0);
                TXYZColor(TTristimulusPoint aPoint);

// === Destructor === virtual  ~TXYZColor();

// === Gets === virtual  void    GetXYZColor(TXYZColor& aXYZColor)const;
                virtual  void    GetRGBColor(TRGBColor& aRGBColor)const;
                virtual  void    GetGrayColor(TGrayColor& aGrayColor)const;

//              virtual  long    FindListIndex(TColorList& colors)const;

void GetComponents(
                        TristimulusCoord& X,
```

```
                        TristimulusCoord& Y,
                        TristimulusCoord& Z,
                        GIntensity& opacity)const;
        void GetAll(
                        TristimulusCoord& X,
                        TristimulusCoord& Y,
                        TristimulusCoord& Z,
                        GIntensity& opacity,
                        TColorGamut*& theColorGamut)const;
        void GetClampedComponents(
                        TristimulusCoord& X,
                        TristimulusCoord& Y,
                        TristimulusCoord& Z,
                        GIntensity& opacity)const;

TristimulusCoord GetX()const;
        TristimulusCoord GetY()const;
        TristimulusCoord GetZ()const;

GCoordinate  GetColorDifference(const TXYZColor& Color2)const;

// === Returns === virtual TXYZColor              ReturnXYZColor()const;

// === Sets === virtual void    SetWithXYZColor(const TXYZColor& aXYZColor);
        void            SetColor(const TColor& aColor);
        virtual void    SetWithRGBColor(const TRGBColor& aRGBColor);
        virtual void    SetWithGrayColor(const TGrayColor& aGrayColor);

void    SetAll(
                        TColorGamut* theColorGamut,
                        TristimulusCoord X,
                        TristimulusCoord Y,
                        TristimulusCoord Z,
                        GIntensity opacity = 1.0);

void    SetComponents(
                        TristimulusCoord X,
                        TristimulusCoord Y,
                        TristimulusCoord Z,
                        GIntensity opacity = 1.0 );

void    SetX(TristimulusCoord X);
        void    SetY(TristimulusCoord Y);
        void    SetZ(TristimulusCoord Z);

// === Base Functionality ===

TXYZColor&  operator= (const TXYZColor& Source);
        void        PrintObject() const;        // gone before shipping // === MCollectible ===

MCollectibleDeclarationsMacro(TXYZColor);
        virtual Boolean    IsEqual (const MCollectible* Source) const;
        virtual TStream&   operator>>= (TStream&) const;
        virtual TStream&   operator<<= (TStream&);
```

```
// === TXYZColor math ===
        friend      Boolean     operator<= ( const TXYZColor& Color1,const TXYZColor& Color2);
        friend      Boolean     operator<  ( const TXYZColor& Color1,const TXYZColor& Color2);
        friend      Boolean     operator>  ( const TXYZColor& Color1,const TXYZColor& Color2);
        friend      Boolean     operator>= ( const TXYZColor& Color1,const TXYZColor& Color2);
        friend      Boolean     operator!= ( const TXYZColor& Color1,const TXYZColor& Color2);
        friend TXYZColor        operator+  ( const TXYZColor& Color1,const TXYZColor& Color2);
        friend TXYZColor        operator-  ( const TXYZColor& Color1,const TXYZColor& Color2);
        friend TXYZColor        operator*  ( const TXYZColor& Color1,const float aSXYZar );
        friend TXYZColor        operator/  ( const TXYZColor& Color1,const float aSXYZar );
        friend TXYZColor        operator*  ( const float aSXYZar,const TXYZColor& Color1);
        friend TXYZColor        operator/  ( const float aSXYZar,const TXYZColor& Color1);
        TXYZColor&  operator+= ( const TristimulusCoord aSXYZar);
        TXYZColor&  operator-= ( const TristimulusCoord aSXYZar);
        TXYZColor&  operator*= ( const float aSXYZar);
        TXYZColor&  operator/= ( const float aSXYZar);

protected:
    private:
        TristimulusCoord  fX ,fY,fZ;

};

// === Inlines === inline void TXYZColor::GetComponents(
                        TristimulusCoord& X,
                        TristimulusCoord& Y,
                        TristimulusCoord& Z,
                        GIntensity& opacity)const
{
    X = fX; Y = fY; Z = fZ; opacity = fOpacity;
} inline TristimulusCoord TXYZColor::GetX() const
{ return (fX);} inline TristimulusCoord TXYZColor::GetY() const
{ return (fY);} inline TristimulusCoord TXYZColor::GetZ() const
{ return (fZ); } endif
```

```
/*========================================
//
||    File:      LabColor.h
||
||    What:      LabColor used to define interfaces for TLabColor
||
||               Copyright ©           Apple Computer, Inc.
||               All Rights Reserved.
||
||
||
||
*/ ifndef __LabCOLOR__
define __LabCOLOR__ ifndef __COLOR__
include <Color.h>
endif ifndef __TRISTIMULUSPOINT__
include <TriStimulusPoint.h>
endif ifndef __COLORGAMUT__
include <ColorGamut.h>
endif ifndef __STREAM__
include <stream.h>
endif ifndef __FSTREAM__
include <fstream.h>
endif ifndef __XYZCOLOR_
include <XYZColor.h>
endif class TLabColor: public TColor{
        public:

// === Constructors ===

TLabColor();
            TLabColor(const TColor& aColor);
            TLabColor(TColorGamut* theColorGamut);
            TLabColor(
                TristimulusCoord L,
                TristimulusCoord a,
                TristimulusCoord b,
                GIntensity opacity = 1.0);
            TLabColor(const TLabColor& aLabColor);
            TLabColor(
                TColorGamut* theColorGamut,
                TristimulusCoord L,
                TristimulusCoord a,
                TristimulusCoord b,
                GIntensity opacity = 1.0);
            TLabColor(TLabColor& aLabColor,TTristimulusPoint& aRefWhite);
```

```
// === Destructor === virtual    ~TLabColor();

// === Gets === virtual    void    GetXYZColor(TXYZColor& aXYZColor)const;
            virtual    void    GetLabColor(TLabColor& aLabColor)const;
            virtual    void    GetRGBColor(TRGBColor& aRGBColor)const;
            virtual    void    GetGrayColor(TGrayColor& aGrayColor)const;

//          virtual    long    FindListIndex(TColorList& colors)const;

void GetComponents(
                            TristimulusCoord& L,
                            TristimulusCoord& a,
                            TristimulusCoord& b,
                            GIntensity& opacity)const;
            void GetAll(
                            TristimulusCoord& L,
                            TristimulusCoord& a,
                            TristimulusCoord& b,
                            GIntensity& opacity,
                            TColorGamut*& theColorGamut)const;
            void GetClampedComponents(
                            TristimulusCoord& L,
                            TristimulusCoord& a,
                            TristimulusCoord& b,
                            GIntensity& opacity)const;

TristimulusCoord GetL()const;
            TristimulusCoord Geta()const;
            TristimulusCoord Getb()const;

// === Returns === virtual TLabColor            ReturnLabColor()const;

// === Sets === virtual void    SetWithXYZColor(const TXYZColor& aXYZColor);
            void            SetColor(const TColor& aColor);
            virtual void    SetWithLabColor(const TLabColor& aLabColor);
            virtual void    SetWithRGBColor(const TRGBColor& aRGBColor);
            virtual void    SetWithGrayColor(const TGrayColor& aGrayColor);

void    SetAll(
                            TColorGamut* theColorGamut,
                            TristimulusCoord L,
                            TristimulusCoord a,
                            TristimulusCoord b,
                            GIntensity opacity = 1.0);

void    SetComponents(
                            TristimulusCoord L,
                            TristimulusCoord a,
                            TristimulusCoord b,
                            GIntensity opacity = 1.0 );

void    SetL(TristimulusCoord L);
            void    Seta(TristimulusCoord a);
```

```cpp
                void        Setb(TristimulusCoord b);

// === Base Functionality ===

TLabColor&  operator= (const TLabColor& Source);
                void        PrintObject() const;         // gone before shipping // === MCollectible ===

MCollectibleDeclarationsMacro(TLabColor);
                virtual Boolean   IsEqual (const MCollectible* Source) const;
                virtual TStream&  operator>>= (TStream&) const;
                virtual TStream&  operator<<= (TStream&);

// === Colorimetry ===
                GCoordinate GetCorrelateOfLightness();
        GCoordinate GetCorrelatesOfChroma();
        GCoordinate GetHueAngle();
        GCoordinate GetHueDifference(const TLabColor& Color2);
                GCoordinate GetColorDifference(const TLabColor& color2)const;

void GetRefWhite(TTristimulusPoint& aRefWhite);

void SetRefWhite(TTristimulusPoint& aRefWhite);
        void SetRefWhite(TristimulusCoord X,TristimulusCoord Y,TristimulusCoord Z);
        void SetRefWhite(Temperature aTemperature);

// === TLabColor math === friend      Boolean     operator<= ( const TLabColor& Color1,const TLabColor& Color2);
                friend      Boolean     operator<  ( const TLabColor& Color1,const TLabColor& Color2);
                friend      Boolean     operator>  ( const TLabColor& Color1,const TLabColor& Color2);
                friend      Boolean     operator>= ( const TLabColor& Color1,const TLabColor& Color2);
                friend      Boolean     operator!= ( const TLabColor& Color1,const TLabColor& Color2);
                friend TLabColor        operator+  ( const TLabColor& Color1,const TLabColor& Color2);
                friend TLabColor        operator-  ( const TLabColor& Color1,const TLabColor& Color2);
                friend TLabColor        operator*  ( const TLabColor& Color1,const float aSLabar );
                friend TLabColor        operator/  ( const TLabColor& Color1,const float aSLabar );
                friend TLabColor        operator*  ( const float aSLabar,const TLabColor& Color1);
                friend TLabColor        operator/  ( const float aSLabar,const TLabColor& Color1);
                            TLabColor&  operator+= ( const TristimulusCoord aSLabar);
                            TLabColor&  operator-= ( const TristimulusCoord aSLabar);
                            TLabColor&  operator*= ( const float aSLabar);
                            TLabColor&  operator/= ( const float aSLabar);

protected:
        private:
                TristimulusCoord  fL,fa,fb;
                static TristimulusCoord fRefWhiteX,fRefWhiteY,fRefWhiteZ;

};

// === Inlines === inline void TLabColor::GetComponents
                                (TristimulusCoord& L,
                                TristimulusCoord& a,
                                TristimulusCoord& b,
                                GIntensity& opacity)const
{
        L = fL; a = fa; b = fb; opacity = fOpacity;
}
```

```
inline TristimulusCoord TLabColor::GetL() const
{ return (fL); } inline TristimulusCoord TLabColor::Geta() const
{ return (fa); } inline TristimulusCoord TLabColor::Getb() const
{ return (fb); } endif
```

```
/*==========================================
||
||   File:     RGBColor.h
||
||   What:    RGBColor used to define interfaces for TRGBColor
||
||            Copyright ©         Apple Computer, Inc.
||            All Rights Reserved.
||
||
||
||
||
||
||
||
||
||
*/ ifndef __RGBCOLOR__
define __RGBCOLOR__ class TColorGamut;

ifndef __TRISTIMULUSPOINT__
include <TriStimulusPoint.h>
endif ifndef __DEVICECOLOR__
include <DeviceColor.h>
endif class TRGBColor: public TDeviceColor{
        public:

// === Constructors ===

TRGBColor();
            TRGBColor(const TColor& aColor);
            TRGBColor(const TDeviceColor& aDeviceColor);
            TRGBColor(TColorGamut* theDeviceColorGamut);
            TRGBColor(
                GIntensity Red,
                GIntensity Green,
                GIntensity Blue,
                GIntensity opacity = 1.0);
            TRGBColor(const TRGBColor& aRGBColor);
            TRGBColor(
                TColorGamut* theDeviceColorGamut,
                GIntensity Red,
                GIntensity Green,
                GIntensity Blue,
                GIntensity opacity = 1.0);

// === Destructor === virtual   ~TRGBColor();

// === Gets ===
```

```
        void    GetXYZColor(TXYZColor& aXYZColor)const;
virtual void    GetRGBColor(TRGBColor& aRGBColor)const;
virtual void    GetGrayColor(TGrayColor& aGrayColor)const;

virtual long    FindListIndex(TColorList& colors)const;

void GetComponents(
                GIntensity& Red,
                GIntensity& Green,
                GIntensity& Blue,
                GIntensity& opacity)const;
void GetAll(
                GIntensity& Red,
                GIntensity& Green,
                GIntensity& Blue,
                GIntensity& opacity,
                TColorGamut*& theColorGamut)const;
void GetClampedComponents(
                GIntensity& Red,
                GIntensity& Green,
                GIntensity& Blue,
                GIntensity& opacity)const;

GIntensity  GetRed()const;
GIntensity  GetGreen()const;
GIntensity  GetBlue()const;

GCoordinate GetColorDifference(const TRGBColor& color2)const;
```

// === Returns ===

```
virtual TRGBColor           ReturnRGBColor()const;
```

// === Sets ===

```
        void    SetWithXYZColor(const TXYZColor& aXYZColor);
void    SetColor(const TColor& aColor);

virtual void    SetWithRGBColor(const TRGBColor& aRGBColor);
virtual void    SetWithGrayColor(const TGrayColor& aGrayColor);

void    SetAll(
                TColorGamut* theDeviceColorGamut,
                GIntensity Red,
                GIntensity Green,
                GIntensity Blue,
                GIntensity opacity = 1.0);

void    SetComponents(
                GIntensity Red,
                GIntensity Green,
                GIntensity Blue,
                GIntensity opacity = 1.0 );

void    SetRed(GIntensity Red);
void    SetGreen(GIntensity Green);
void    SetBlue(GIntensity Blue);

void    ClampComponents();
void    ScaleComponents();
```

// === Base Functionality ===

```
        TRGBColor&   operator= (const TRGBColor& Source);
        void         PrintObject() const;        // gone before shipping // === MCollectible ===

MCollectibleDeclarationsMacro(TRGBColor);
        virtual Boolean   IsEqual (const MCollectible* Source) const;
        virtual TStream&  operator>>= (TStream&) const;
        virtual TStream&  operator<<= (TStream&);

// === TRGBColor math === friend          Boolean      operator<= ( const TRGBColor& Color1,const TRGBColor& Color2);
        friend          Boolean      operator<  ( const TRGBColor& Color1,const TRGBColor& Color2);
        friend          Boolean      operator>  ( const TRGBColor& Color1,const TRGBColor& Color2);
        friend          Boolean      operator>= ( const TRGBColor& Color1,const TRGBColor& Color2);
        friend          Boolean      operator!= ( const TRGBColor& Color1,const TRGBColor& Color2);
        friend TRGBColor             operator+  ( const TRGBColor& Color1,const TRGBColor& Color2);
        friend TRGBColor             operator-  ( const TRGBColor& Color1,const TRGBColor& Color2);
        friend TRGBColor             operator*  ( const TRGBColor& Color1,const float aScalar );
        friend TRGBColor             operator/  ( const TRGBColor& Color1,const float aScalar );
        friend TRGBColor             operator*  ( const float aScalar,const TRGBColor& Color1);
        friend TRGBColor             operator/  ( const float aScalar,const TRGBColor& Color1);
                        TRGBColor&   operator+= ( const TristimulusCoord aScalar);
                        TRGBColor&   operator-= ( const TristimulusCoord aScalar);
                        TRGBColor&   operator*= ( const float aScalar);
                        TRGBColor&   operator/= ( const float aScalar);

GIntensity fRed,fGreen,fBlue;
protected:
private:

// === All This stuff is going away in D22 ===
// === All This stuff is going away in D22 ===
// === All This stuff is going away in D22 ===
// === All This stuff is going away in D22 ===
public:

void Get(GIntensity& r,GIntensity& g,GIntensity& b,GIntensity& m)const;

void Set(GIntensity r,GIntensity g,GIntensity b,GIntensity m = 1.0 );

virtual void       GetColor ( TRGBColor& color ) const;
        virtual void       GetColor ( TColor& color ) const;
        virtual void       GetColor ( TGrayColor& color ) const;
        virtual long       GetComponentCount() const;
        virtual void       GetComponents(GIntensity *components) const;

void SetRGB(GIntensity Red,GIntensity Green,GIntensity Blue);
void SetRGB(const TRGBColor& aColor);
void SetRGB(const TXYZColor& aXYZColor);

virtual void Clamp();
virtual void Scale();
// === All This stuff is going away in D22 ===
// === All This stuff is going away in D22 ===
// === All This stuff is going away in D22 ===
// === All This stuff is going away in D22 ===
```

```
/*===================================
||
||   File:      ColorGamut.h
||
||   What:   ColorGamut routines for Color matching
||
||                Copyright ©      Apple Computer, Inc.
||                All Rights Reserved.
||
||
||
||
||
||
||
||
*/ ifndef __COLORGAMUT__
define __COLORGAMUT__ class TColor;
class TRGBColor;
class TXYZColor;

#ifndef __ATTRIBUTES__
include <Attributes.h>
endif ifndef __TRISTIMULUSPOINT__
include <TriStimulusPoint.h>
endif typedef char ColorFileName;
const  MatrixDimension=3;
typedef double TransMatrix[MatrixDimension][MatrixDimension];
typedef double MatrixValue;
typedef long MatrixIndex;

//================//
// TColorGamut //
//================// class TColorGamut : public TAttribute{ public:
 TColorGamut(ColorFileName *FileName);
 TColorGamut(const TColorGamut& aColorGamut);
 TColorGamut();
  virtual ~TColorGamut();

virtual void GetRedPoint(TTristimulusPoint& aPoint) const;
virtual void GetGreenPoint(TTristimulusPoint& aPoint) const;
virtual void GetBluePoint(TTristimulusPoint& aPoint) const;
virtual void GetCyanPoint(TTristimulusPoint& aPoint) const;
virtual void GetYellowPoint(TTristimulusPoint& aPoint) const;
virtual void GetMagentaPoint(TTristimulusPoint& aPoint) const;
virtual void GetBlackPoint(TTristimulusPoint& aPoint) const;
virtual void GetWhitePoint(TTristimulusPoint& aPoint) const;
```

```
virtual void SetRedPoint(const TTristimulusPoint& aPoint );
virtual void SetGreenPoint(const TTristimulusPoint& aPoint );
virtual void SetBluePoint(const TTristimulusPoint& aPoint );
virtual void SetCyanPoint(const TTristimulusPoint& aPoint );
virtual void SetYellowPoint(const TTristimulusPoint& aPoint );
virtual void SetMagentaPoint(const TTristimulusPoint& aPoint );
virtual void SetBlackPoint(const TTristimulusPoint& aPoint );
virtual void SetWhitePoint(const TTristimulusPoint& aPoint );

ColorFileName *gettheFileName() const;

// === Base Functionality ===

TColorGamut*   GetColorGamut();

void GetXYZ2RGBMatrix(TransMatrix& XYZ2RGBMatrix)const;
            void GetRGB2XYZMatrix(TransMatrix& RGB2XYZMatrix)const;

void ConvertRGBtoXYZ(
        const TRGBColor& aRGBColor,
            TXYZColor& aConvertedXYZColor)const;

void ConvertXYZtoRGB(
                        const TXYZColor& aXYZColor,
            TRGBColor& aConvertedRGBColor)const;

const TColorGamut&        operator= ( const TColorGamut& source );
virtual void PrintObject() const ;
void PrintMatrix() const;

// === MCollectible overrides ===

MCollectibleDeclarationsMacro (TColorGamut);
            virtual Boolean          IsEqual ( const MCollectible* ) const;
            virtual TStream&  operator>>= ( TStream& to here ) const;
            virtual TStream&  operator<<= ( TStream& from where );

friend void TTristimulusPoint::ConvertxyY2TristimulusCoord(float x, float y, float Y);

protected:
private:

ColorFileName     fthefileName[80];
         TTristimulusPoint    fRed, fGreen, fBlue,
                    fCyan, fYellow, fMagenta,
                                      fBlack, fWhite;

// Stuff to go between RGB<->XYX double fXYZ2RGB[3][3];
            double fRGB2XYZ[3][3];
virtual void MakefXYZ2RGBMatrix() const;
    void DefineTransformationMatrix() const;
```

File: ColorProfile.h

Copyright © Apple Computer, Inc.
All Rights Reserved.

```
//----------------------------------------------------------------
class TColorProfile : public TColorGamut
{
public:
        ~TColorProfile();

const TColorMatcher*   GetColorMatcher();

private:
        TColorProfile();

};
#endif

//----------------------------------------------------------------
class TAppleColorProfile : public TColorProfile
{
public:
        TAppleColorProfile();
        TAppleColorProfile(ColorFileName *FileName);
         TAppleColorProfile(const TAppleColorProfile& aAppleColorProfile);
        ~TAppleColorProfile();
// make a new color profike TAppleColorProfile(TColorGamut& theColorGamut,
                            TGCurve& Black,
                            TGCurve& Cyan,
                            TGCurve& Green,
                            TGCurve& Yellow,
                            TGCurve& Red,
                            TGCurve& Magenta,
                            TGCurve& Blue,
                            TGCurve& Gray);

TAppleColorProfile(TColorGamut& theColorGamut,
                            TGCurve& GamutLikeCurve);

// For Characterization of monitors
TImage       *MakeMonitorTImageScreen(int ScrnPixX,int ScrnPixY,TRGBColor& theColor);
unsigned char *MakeMonitorImageScreen (int ScrnPixX,int ScrnPixY,TRGBColor& theColor);

// For Characterization of Printers
TImage       *MakePrinterImage(int SquareSize);
unsigned char *MakePrinterTImage(int SquareSize);

virtual void PrintObject() const;

virtual const TonalReproValue* GetRedCurve()   const;
virtual const TonalReproValue* GetGreenCurve()   const;
virtual const TonalReproValue* GetBlueCurve()   const;
virtual const TonalReproValue* GetCyanCurve()   const;
virtual const TonalReproValue* GetYellowCurve()   const;
virtual const TonalReproValue* GetMagentaCurve()   const;
virtual const TonalReproValue* GetBlackCurve()   const;

//Match it Tcolor
```

```cpp
        void getMatchedColorClamped(TColor& UnmatchedColor,TColor& MatchedColor);

//Match it PixelBuffer
        void getMatchedPixelBufferClamped(const TColorGamut& fromColorGamut);

// === MCollectible overrides ===

MCollectibleDeclarationsMacro (TAppleColorProfile);
            virtual Boolean         IsEqual ( const MCollectible* ) const;
            virtual TStream&  operator>>= ( TStream& towhere ) const;
            virtual TStream&  operator<<= ( TStream& fromwhere );

private:
        TonalReproValue fRedCurve[DimTonalReproCurve],
                fGreenCurve[DimTonalReproCurve],
                        fBlueCurve[DimTonalReproCurve],
                fCyanCurve[DimTonalReproCurve],
                        fYellowCurve[DimTonalReproCurve],
                        fMagentaCurve[DimTonalReproCurve],
                        fBlackCurve[DimTonalReproCurve];

// Matching Stuff
Boolean   fColorMatcherHasBeenCreated;
        void CreateColorMatcher(const TColorGamut& fromColorGamut);
        void DestroyColorMatcher();

};
#endif
```

```
//----------------------------------------------------------
class TAppleColorProfile : public TColorProfile
{
public:
        TAppleColorProfile();
        TAppleColorProfile(ColorFileName *FileName);
        TAppleColorProfile(const TAppleColorProfile& aAppleColorProfile);
        ~TAppleColorProfile();
// make a new color profike TAppleColorProfile(TColorGamut& theColorGamut,
                                TGCurve& Black,
                                TGCurve& Cyan,
                                TGCurve& Green,
                                TGCurve& Yellow,
                                TGCurve& Red,
                                TGCurve& Magenta,
                                TGCurve& Blue,
                                TGCurve& Gray);

TAppleColorProfile(TColorGamut& theColorGamut,
                                TGCurve& GamutLikeCurve);

// For Characterization of monitors
TImage      *MakeMonitorTImageScreen(int ScrnPixX,int ScrnPixY,TRGBColor& theColor);
unsigned char *MakeMonitorImageScreen(int ScrnPixX,int ScrnPixY,TRGBColor& theColor);

// For Characterization of Printers
TImage      *MakePrinterImage(int SquareSize);
unsigned char *MakePrinterTImage(int SquareSize);

virtual void PrintObject() const;

virtual const TonalReproValue* GetRedCurve() const;
virtual const TonalReproValue* GetGreenCurve() const;
virtual const TonalReproValue* GetBlueCurve() const;
virtual const TonalReproValue* GetCyanCurve() const;
virtual const TonalReproValue* GetYellowCurve() const;
virtual const TonalReproValue* GetMagentaCurve() const;
virtual const TonalReproValue* GetBlackCurve() const;

//Match it Tcolor void getMatchedColorClamped(TColor& UnmatchedColor,TColor& MatchedColor);

//Match it PixelBuffer
void getMatchedPixelBufferClamped(const TColorGamut& fromColorGamut);

// === MCollectible overrides ===

MCollectibleDeclarationsMacro (TAppleColorProfile);
                    virtual Boolean         IsEqual ( const MCollectible* ) const;
                    virtual TStream&  operator>>= ( TStream& towhere ) const;
                    virtual TStream&  operator<<= ( TStream& fromwhere )

private:
```

```
TonalReproValue fRedCurve[DimTonalReproCurve],
                fGreenCurve[DimTonalReproCurve],
                                fBlueCurve[DimTonalReproCurve],
                fCyanCurve[DimTonalReproCurve],
                                fYellowCurve[DimTonalReproCurve],
                                fMagentaCurve[DimTonalReproCurve],
                                fBlackCurve[DimTonalReproCurve];

// Matching Stuff
Boolean     fColorMatcherHasBeenCreated;
            void CreateColorMatcher(const TColorGamut& fromColorGamut);
            void DestroyColorMatcher();

};
#endif
```

```
class TColorMatcher : public MCollectible
{
public:

virtual ~TColorMatchFunction();

TColorMatchFunction();

vitural void ColorMatchFunction(const TColor& theColor, TColor& theMatchedColor, TColorState&
 theColorState,Token& HowToMatch);

unsigned long GetSeed()const;

private:
          unsigned long fseed;

};

static const TColorMatcher* CreateColorMatcher();

static void SetColorMatcher(const TColorMatcher& newColorMatcher);

static unsigned long GetColorMatcherSeed()const;

in .c static TColorMatch* gColorMatcher = NIL;
 static unsigned long gMatcherSeed = 0;

TColorMatcher* CreateColorMatcher()
 {
         if (gColorMatcher == NIL)
                 gColorMatcher = new TColorMatcher;
         return gColorMatcher->Clone();
 } void SetColorMatcher(const TColorMatcher& newColorMatcher)
 {
         gMatcherSeed++;
         delete gColorMatcher;
         gColorMatcher = newColorMatcher.Clone();
 } unsigned long GetColorMatcherSeed()
 {
         return gMatcherSeed;
 };
```

Class TCALColor

```
/*=================
//
//      File:   CALColor.h
//
//
//
//                          Copyright ©    Apple Computer, Inc.
//                          All Rights Reserved.
//
//
//
//
*/
#ifndef __CALCOLORTEMPLATE__
define __CALCOLORTEMPLATE__ class TColorGamut;

ifndef __TRISTIMULUSPOINT__
include <TriStimulusPoint.h>
endif ifndef __COLOR__
include <Color.h>
endif class TCALColor: public TColor{
        public:

// === Constructors ===

TCALColor();
            TCALColor(const TColor& aColor);
            TCALColor(TColorGamut* theColorGamut);
            TCALColor(
                TristimulusCoord Component1,
                TristimulusCoord Component2,
                TristimulusCoord Component3,
                GIntensity opacity = 1.0);
            TCALColor(const TCALColor& aCALColor);
            TCALColor(
                TColorGamut* theColorGamut,
                TristimulusCoord Component1,
                TristimulusCoord Component2,
                TristimulusCoord Component3,
```

```
                            GIntensity opacity = 1.0);
//      TCALColor(TCALColor& aCALColor,TTristimulusPoint& aRefWhite);

// === Destructor === virtual  ~TCALColor();

// === Gets === virtual  void    GetXYZColor(TXYZColor& aXYZColor)const;
            virtual  void    GetCALColor(TCALColor& aCALColor)const;
            virtual  void    GetRGBColor(TRGBColor& aRGBColor)const;
            virtual  void    GetGrayColor(TGrayColor& aGrayColor)const;

//          virtual  long    FindListIndex(TColorList& colors)const;

void GetComponents(
                            TristimulusCoord& Component1,
                            TristimulusCoord& Component2,
                            TristimulusCoord& Component3,
                            GIntensity& opacity)const;
            void GetAll(
                            TristimulusCoord& Component1,
                            TristimulusCoord& Component2,
                            TristimulusCoord& Component3,
                            GIntensity& opacity,
                            TColorGamut*& theColorGamut)const;
            void GetClampedComponents(
                            TristimulusCoord& Component1,
                            TristimulusCoord& Component2,
                            TristimulusCoord& Component3,
                            GIntensity& opacity)const;

TristimulusCoord GetComponent1()const;
            TristimulusCoord GetComponent2()const;
            TristimulusCoord GetComponent3()const;

// === Returns === virtual  TCALColor         ReturnCALColor()const;

// === Sets === virtual  void    SetWithXYZColor(const TXYZColor& aXYZColor);
            void             SetColor(const TColor& aColor);
            virtual  void    SetWithCALColor(const TCALColor& aCALColor);
            virtual  void    SetWithRGBColor(const TRGBColor& aRGBColor);
            virtual  void    SetWithGrayColor(const TGrayColor& aGrayColor);

void     SetAll(
                            TColorGamut* theColorGamut,
                            TristimulusCoord Component1,
                            TristimulusCoord Component2,
                            TristimulusCoord Component3,
                            GIntensity opacity = 1.0);

void     SetComponents(
                            TristimulusCoord Component1,
                            TristimulusCoord Component2,
                            TristimulusCoord Component3,
                            GIntensity opacity = 1.0 );
```

```
                void    SetComponent1(TristimulusCoord Component1);
                void    SetComponent2(TristimulusCoord Component2);
                void    SetComponent3(TristimulusCoord Component3);

// === Base Functionality ===

TCALColor&  operator=(const TCALColor& Source);
                void        PrintObject() const;        // gone before shipping // === MCollectible ===

MCollectibleDeclarationsMacro(TCALColor);
                virtual Boolean  IsEqual (const MCollectible* Source) const;
                virtual TStream& operator>>= (TStream&) const;
                virtual TStream& operator<<= (TStream&);

// === Colorimetry ===
                GCoordinate GetCorrelateOfLightness();
        GCoordinate GetCorrelatesOfChroma();
        GCoordinate GetHueAngle();
        GCoordinate GetHueDifference(const TCALColor& Color2);
                GCoordinate GetColorDifference(const TCALColor& color2)const;

void SetRefWhite(TTristimulusPoint& aRefWhite);
        void SetRefWhite(TristimulusCoord X,TristimulusCoord Y,TristimulusCoord Z);
        void SetRefWhite(Temperature aTemperature);

// === TCALColor math === friend      Boolean     operator<= ( const TCALColor& Color1,const TCALColor& Color2);
        friend      Boolean     operator<  ( const TCALColor& Color1,const TCALColor& Color2);
        friend      Boolean     operator>  ( const TCALColor& Color1,const TCALColor& Color2);
        friend      Boolean     operator>= ( const TCALColor& Color1,const TCALColor& Color2);
        friend      Boolean     operator!= ( const TCALColor& Color1,const TCALColor& Color2);
        friend TCALColor        operator-  ( const TCALColor& Color1,const TCALColor& Color2);
        friend TCALColor        operator+  ( const TCALColor& Color1,const TCALColor& Color2);
        friend TCALColor        operator*  ( const TCALColor& Color1,const float aScalar );
        friend TCALColor        operator/  ( const TCALColor& Color1,const float aScalar );
        friend TCALColor        operator*  ( const float aScalar,const TCALColor& Color1);
        friend TCALColor        operator/  ( const float aScalar,const TCALColor& Color1);
                TCALColor&      operator-= ( const TristimulusCoord aScalar);
                TCALColor&      operator+= ( const TristimulusCoord aScalar);
                TCALColor&      operator*= ( const float aScalar);
                TCALColor&      operator/= ( const float aScalar);

protected:
        private:
                TristimulusCoord    fComponent1 ,fComponent2,fComponent3;
                static TristimulusCoord fRefWhiteX,fRefWhiteY,fRefWhiteZ;

};

// === Inlines === inline void TCALColor::GetComponents(
                            TristimulusCoord& Component1,
                            TristimulusCoord& Component2,
                            TristimulusCoord& Component3,
                            GIntensity& opacity)const
{
    Component1 = fComponent1; Component2 = fComponent2; Component3 = fComponent3; opacity = fOpacity;
}
```

```
inline TristimulusCoord TCALColor::GetComponent1() const
{ return (fComponent1); } inline TristimulusCoord TCALColor::GetComponent2() const
{ return (fComponent2); } inline TristimulusCoord TCALColor::GetComponent3() const
{ return (fComponent3); } endif
```

Class TDEV3Color

```
/*================
//
//     File:    DEV3Color.h
//
//
//
//                       Copyright ©      Apple Computer, Inc.
//                       All Rights Reserved.
//
//
//
//
//
*/ ifndef __DEVCOLORTEMPLATE__
define __DEVCOLORTEMPLATE__ class TColorGamut;

ifndef __TRISTIMULUSPOINT__
include <TriStimulusPoint.h>
endif include <DeviceColor.h> class TDEV3Color: public TDeviceColor{
          public:

// === Constructors ===

TDEV3Color();
                    TDEV3Color(const TColor& aColor);
                    TDEV3Color(const TDeviceColor& aDeviceColor);
                    TDEV3Color(TColorGamut* theDeviceColorGamut);
                    TDEV3Color(
                         GIntensity Component1,
                         GIntensity Component2,
                         GIntensity Component3,
                         GIntensity opacity = 1.0);
                    TDEV3Color(const TDEV3Color& aDEV3Color);
                    TDEV3Color(
                         TColorGamut* theDeviceColorGamut,
                         GIntensity Component1,
                         GIntensity Component2,
                         GIntensity Component3,
                         GIntensity opacity = 1.0);

// === Destructor === virtual   ~TDEV3Color();

// === Gets === virtual   void   GetXYZColor(TXYZColor& aXYZColor)const;
          virtual   void   GetDEV3Color(TDEV3Color& aDEV3Color)const;
          virtual   void   GetRGBColor(TRGBColor& aRGBColor)const;
```

```
            virtual  void     GetGrayColor(TGrayColor& aGrayColor)const;
//          virtual  long     FindListIndex(TColorList& colors)const;
            void GetComponents(
                                GIntensity&  Component1,
                                GIntensity&  Component2,
                                GIntensity&  Component3,
                                GIntensity&  opacity)const;
            void GetAll(
                                GIntensity&  Component1,
                                GIntensity&  Component2,
                                GIntensity&  Component3,
                                GIntensity&  opacity,
                                TColorGamut*& theColorGamut)const;
            void GetClampedComponents(
                                GIntensity&  Component1,
                                GIntensity&  Component2,
                                GIntensity&  Component3,
                                GIntensity&  opacity)const;

GIntensity GetComponent1()const;
            GIntensity GetComponent2()const;
            GIntensity GetComponent3()const;

GCoordinate    GetColorDifference(const TDEV3Color& color2)const;

// === Returns === virtual TDEV3Color        ReturnDEV3Color()const;

// === Sets === virtual  void    SetWithXYZColor(const TXYZColor& aXYZColor);
            void             SetColor(const TColor& aColor);
            virtual  void    SetWithDEV3Color(const TDEV3Color& aDEV3Color);
            virtual  void    SetWithRGBColor(const TRGBColor& aRGBColor);
            virtual  void    SetWithGrayColor(const TGrayColor& aGrayColor);

void     SetAll(
                                TColorGamut* theDeviceColorGamut,
                                GIntensity  Component1,
                                GIntensity  Component2,
                                GIntensity  Component3,
                                GIntensity  opacity = 1.0);

void     SetComponents(
                                GIntensity  Component1,
                                GIntensity  Component2,
                                GIntensity  Component3,
                                GIntensity  opacity = 1.0 );

void     SetComponent1(GIntensity  Component1);
            void     SetComponent2(GIntensity  Component2);
            void     SetComponent3(GIntensity  Component3);

void     ClampComponents();
            void     ScaleComponents();

// === Base Functionality ===

TDEV3Color&    operator= (const TDEV3Color& Source);
            void           PrintObject() const;       // gone before shipping
```

What is claimed is:

1. A color processing system capable of interfacing with a plurality of peripheral devices, comprising:
   a) a data processor to which the plurality of peripheral devices may be coupled; and
   b) an operating system, having an object-oriented architecture and being stored in said data processor, for supporting color and for
      i) processing calibrated and uncalibrated colors in relation to calibrated color space and uncalibrated color space, respectively;
      ii) transforming uncalibrated colors into calibrated colors;
      iii) transforming a given color into an RGB color and an XYZ color;
      iv) transforming an RGB color and an XYZ color into a color in a given color space;
      v) transforming a calibrated color into a color in a given color space;
      vi) storing a color gamut associated with one of the peripheral devices; and
      vii) storing a tonal reproduction curve associated with one of the peripheral devices.

2. A color processing system, according to claim 1, wherein said object-oriented operating system includes transform algorithms for transforming an uncalibrated color into an RGB color in RGB color space and for transforming the RGB color into a calibrated XYZ color in XYZ color space, for carrying out function(b)(ii).

3. A color processing system, according to claim 2, wherein said object-oriented operating system includes transform algorithums for transforming said calibrated color into an XYZ color in calibrated color space and for transforming the XYZ color into an uncalibrated RGB color in RGB color space.

4. A color processing system according to claim 1 wherein said object-oriented operating system includes a template class for adding a color space to the architecture.

5. A color processing system according to claim 1, wherein said object-oriented operating system includes a class having a file constructor for storing color gamut data of a given peripheral device in the operating system.

6. A color processing system according to claim 5 wherein said object-oriented operating system includes a class having a file constructor for storing tonal reproduction curve data of the given peripheral device in the operating system.

7. A color processing system according to claim 1 wherein said object-oriented architecture is extensible to support a plurality of method functions for color matching colors of different peripheral devices.

8. A color processing system according to claim 1 wherein said object-oriented operating system is in the programming language C++.

9. An object-oriented software operating system architecture for processing uncalibrated and calibrated color amongst a plurality of peripheral color devices having color profiles, the architecture comprising the properties of:
   a) transforming a given color into an uncalibrated color and a calibrated color;
   b) transforming an uncalibrated color and a calibrated color into a color in a given color space; and
   c) storing a color profile of a given one of the peripheral devices.

10. An object-oriented software operating system architecture according to claim 9, wherein the uncalibrated color is RGB color.

11. An object-oriented software operating system architecture according to claim 9, wherein the calibrated color is XYZ color.

12. An object-oriented software operating system architecture according to claim 9, wherein the property of storing includes storing a color profile of any peripheral device in addition to the given peripheral device.

13. An object-oriented software operating system architecture for processing color information amongst a plurality of peripheral color devices coupled to a computer, comprising:
   a) a color model software module for processing color information between any one or more of the plurality of the peripheral color devices acting as a source device and any one or more of the plurality of the peripheral color devices acting as a destination device, said color software module including:
      i) a first interface level (TColor) defining a virtual abstract base class and a container class containing calibrated colors;
      ii) a second interface level (TDeviceColor) defining a virtual abstract base class and a container class containing uncalibrated colors;
      iii) a class (TColorGamut) containing data defining the color gamut of one peripheral device; and
      iv) a class (TColorProfile) containing data defining a tonal reproduction curve for the one peripheral device and method functions for color matching the color of the one peripheral device to another peripheral device;
   b) an input interface software module for inputting color data from one or more of the source devices to said color model software module; and
   c) an output interface software module for outputting color data processed by said color model software module to one or more of the destination devices.

14. An object-oriented software operating system architecture according to claim 13, wherein said first interface color level (TColor) includes a plurality of color classes containing calibrated colors.

15. An object-oriented software operating system architecture according to claim 14 wherein said plurality of color classes containing calibrated colors comprises:
   a) a class (TXYZColor) defining a tristimulus calibrated color space in which tristimulus coordinates XYZ uniquely define a color;
   b) a class (TLuvColor) defining a uniform tristimulus calibrated color space Luv expressing colors in a perceptual linear fashion, in which u and v are static field coordinates of a uniform chromaticity diagram, and L is a static field representing luminance; and
   c) a class (TLabColor) defining a uniform tristimulus calibrated color space Lab expressing colors in a perceptual linear fashion, in which a and b are static field coordinates of a uniform chromaticity diagram and L is a static field representing luminance.

16. An object-oriented software operating system architecture according to claim 15, wherein said static fields Lab define reference white, said static fields Luv define reference white, and said reference white, respectively, is used to transform a Luv color to an XYZ color and a Lab color to an XYZ color.

17. An object-Oriented software operating system architecture according to claim 15, wherein said class (TXYZColor) has a subclass (TSpectralColor) which contains three CIE color-matching functions as weighting functions to obtain a color XYZ from spectral power data.

18. An object-oriented software operating systems architecture according to claim 17 wherein said subclass (TSpectralColor) contains a static array of data representing three CIE power spectrum curves used to obtain a color XYZ.

19. An object-oriented software operating system architecture according to claim 17, wherein said first interface level TColor has a subclass (TTriStimulusPoint) containing data representing tristimulus points and method functions including math operators to manipulate the data.

20. An object-oriented software operating system architecture according to claim 19, wherein said data of the subclass (TTriStimulusPoint) comprises ChromaCoord x, ChromaCoord y and TriStimulusCoord Y data, and said method functions include a method to convert said ChromaCoord x, ChromaCoord y and TriStimulusCoord Y to a calibrated color XYZ.

21. An object-oriented software operating system architecture according to claim 13, wherein said second interface level (TDevice Color) comprises a plurality of classes containing uncalibrated colors.

22. An object-oriented software operating system architecture according to claim 21, wherein said plurality of uncalibrated color classes comprises uncalibrated color space, including:
  a) a class (TRGBColor) defining a Cartesian coordinate based color space of red, green and blue;
  b) a class (TCYMKColor) defining a color space of Cyan, Yellow, Magenta and Black;
  c) a class (THLSColor) defining a color space of hue, lightness and saturation;
  d) a class (THSVColor) defining a color space of hue, saturation and value; and
  e) a class (TGrayColor) defining a color space of gray.

23. An object-oriented software operating system architecture according to claim 15 further comprising a class (TColorGamut) having information to color match an uncalibrated color of one or more source devices to a color of one or more destination devices.

24. An object-oriented software operating system architecture according to claim 23 wherein said class (TColorGamut) comprises two constructors, one being a null constructor defining the color gamut of a predetermined color peripheral device and the other being a file constructor having as its argument a file name containing a color gamut.

25. An object-oriented software operating system architecture according to claim 23 further comprising a class (TColorProfile) which descends from said class (TColorGamut) and which contains data defining tonal reproduction curves of the respective plurality of devices.

26. An object-oriented software system architecture according to claim 25 wherein said class (TColorProfile) comprises two constructors, one being a null constructor defining the color profile of the predetermined color peripheral device and the other being a file constructor having as its argument a file name containing a color gamut.

27. An object-oriented software system architecture, according to claim 13, wherein said class (TColorProfile) containing data defining a tonal reproduction curve may contain tonal reproduction curve data of any device other than the one device.

28. An object-oriented software system architecture for supporting a plurality of peripheral devices which may interface with the architecture, comprising:
  a) a first class (TColor), from which all color classes descend, being a base class and a container class for calibrated colors;
  b) a second class (TDeviceColor) being a base class and a container class for uncalibrated colors, said second class (TDeviceColor) descending directly from said first class (TColor);
  c) a third calibrated color class (TXYZColor) descending directly from said first class (TColor);
  d) a fourth uncalibrated color class (TRGBColor) descending directly from said second class (TDeviceColor);
  e) a fifth class (TColorGamut) containing a template for storing color gamut information of one or more of the peripheral devices; and
  f) a sixth class (TColorProfile) containing a template for storing color profile information of one or more of the peripheral devices.

29. An object-oriented software system architecture according to claim 28, wherein:
  a) said first class (TColor) stores member functions being
    i) GetXYZColor (TXYZColor& aXYZColor);
    ii) GetRGBColor (RGBColor& aRGBColor);
    iii) SetColor (const color& aColor); and
  b) said second class TDeviceColor stores member functions being
    i) GetXYZColor (TXYZColor& aXYZColor);
    ii) GetRGBColor (RGBColor& aRGBColor)const; and
    iii) SetColor (const TColor& aColor).

30. An object-oriented software system architecture according to claim 28 further comprising a seventh class (TSpectralColor) which descends from said third class (TXYZColor), said seventh class (TSpectralColor) storing spectral power data of three curves representing color matching functions.

31. An object-oriented software system architecture according to claim 28 further comprising at least one additional seventh class descending directly from said first class (TColor) and defining calibrated color space.

32. An object-oriented software system architecture according to claim 28 further comprising at least one additional seventh class descending directly from said second class (TDeviceColor) and defining uncalibrated color space.

33. An object-oriented software system architecture according to claim 28 wherein each color class descending directly from said first class (TColor) stores method functions for getting an RGB color and an XYZ color from itself.

34. An object-oriented software system architecture according to claim 28 wherein each class descending directly from said second class (TDeviceColor) stores method functions for getting an RGB color and an XYZ color from itself.

35. An object-oriented software system architecture according to claim 28 wherein each class descending directly from said second class (TColor) stores method functions for setting itself with an RGB color and with an XYZ color.

36. An object-oriented software system architecture according to claim 28 wherein each class descending directly from said second class (TDeviceColor) stores method functions for setting itself with an RGB color and with an XYZ color.

37. An object-oriented system architecture according to claim 28 wherein every class descending directly from said first class (TColor) or said second class (TDeviceColor) has member functions for setting itself from a TColor.

38. An object-oriented system architecture according to claim 28 wherein said sixth class (TProfile) stores method functions for color matching a color of one peripheral device to another peripheral device.

39. An object-oriented system architecture according to claim 28, wherein said third calibrated color class (TXYZColor) stores method functions for transforming a calibrated color to an XYZ color.

40. An object-oriented system architecture according to claim 28, wherein said fourth uncalibrated color class (TRGBColor) stores method functions for transforming an uncalibrated color to an RGB color.

41. An object-oriented system architecture according to claim 28 further comprising a template for adding a color class descending from said frist class (TColor) and corresponding to a calibrated color.

42. An object-oriented systems architecture according to claim 28 further comprising a template for adding a color class descending directly from said second class (TDeviceColor) and corresponding to an uncalibrated color.

43. A method, according to claim 39, wherein the calibrated color space is a CIE-based color space.

44. A method, according to claim 43, whrein the CIE-based color space is XYZ color space.

45. In an object-oriented color system architecture, a method for processing color information between at least one source color device having a color gamut and a color profile and at least one destination color device having a color gamut and a color profile, comprising:
  a) receiving source color data from the source color device;
  b) calling a class (TColorGamut) storing data identifying the color gamuts of the source color device and the destination color device, respectively;
  c) calling a class (TColorProfile) storing data identifying the color profiles of the source color device and the destination color device, respectively;
  d) calling a class storing a method function for matching the color of the source color device to the color of the destination color device;
  e) using the method function, the color gamut data and the color profile data of the source color device and destination color device to provide destination color data matching the source color data; and
  f) sending the destination color data to the destination color device.

46. A method according to claim 45, wherein the source color data and the destination color data are in uncalibrated color space, and wherein the method function comprises:
  a) calling a class (TXYZ) storing data corresponding to calibrated color space;
  b) transforming the source color data to data in the calibrated color space;
  c) color matching the source color data in calibrated color space to destination color data in calibrated color space;
  d) transforming the matched destination color data in calibrated space to the destination color data in uncalibrated color space; and
  e) outputting the transformed destination color data to the destination color device.

47. A method, according to claim 45, wherein the classes (TColorGamut and TColorProfile) store color gamut and color profile data corresponding to color devices in addition to the source color device and the destination color device, and wherein the steps of calling the class (TColorGamut and TColorProfile) accesses the color gamuts and color profiles of any two of the color devices whose colors are to be matched, and wherein the step of calling the method function calls the method function to color match any such two color devices.

48. A method, according to claim 46, wherein the second calibrated color space is XYZ color space and the uncalibrated color space is RGB color space.

49. In an object-oriented color system architecture, a method of processing color, comprising:
  a) receiving a first color in a first calibrated color space;
  b) calling a class storing a first method function;
  c) using the first method function to transform the first color to a second color in a second uncalibrated color space;
  d) calling a class storing a second method function; and
  e) using the second method function to transform the second color in the second uncalibrated color space to a color in a calibrated color space.

50. A method, according to claim 49, wherein the second uncalibrated color space is RGB color space and the uncalibrated color space is XYZ color space.

51. In an object-oriented color system architecture, a method of processing color, comprising:
  a) receiving a first color in a first calibrated color space;
  b) calling a class storing a first method function;
  c) using the first method function to transform the first color to a second color in a second calibrated color space;
  d) calling a class storing a second method function; and
  e) using the second method function to transform the second color in the second calibrated color space to a color in an uncalibrated color space.

52. An operating system architecture for color processing, comprising:
  a first base class associated with calibrated colors;
  a plurality of classes which descend from said first base class and which are respectively associated with a plurality of calibrated color spaces, each of said classes including means for transforming between a color in its associated color space and a color in a predetermined calibrated color space;
  a second base class associated with uncalibrated colors; and
  a plurality of classes which descend from said second base class and which are respectively associated with a plurality of uncalibrated color spaces, each of said classes which descends from said second base class including means for transforming between a color in its associated color space and a color in a preselected color space.

53. The operating system architecture of claim 52, further including a class which stores color gamut information for each of a plurality of input/output devices, and which can be called by said second base class.

54. The operating system architecture of claim 53 further including a class which stores color profile data for each of said input/output devices.

55. The operating system architecture of claim 54 wherein said color profile data includes a tonal reproduction curve.

56. The operating system architecture of claim 54 wherein said class which stores color profile data descends from said class which stores color gamut information.

57. The operating system architecture of claim 52 wherein said second base class descends from said first base class.

58. The operating system architecture of claim 52 wherein said predetermined calibrated color space is an XYZ color space.

59. The operating system architecture of claim 52 wherein said preselected color space is the same as said predetermined calibrated color space.

60. The operating system architecture of claim 52 wherein said preselected color space is an uncalibrated color space.

61. The operating system architecture of claim 60 wherein said preselected color space is an RGB color space.

* * * * *